United States Patent [19]

Adams

[11] Patent Number: 5,313,558

[45] Date of Patent: May 17, 1994

[54] SYSTEM FOR SPATIAL AND TEMPORAL PATTERN LEARNING AND RECOGNITION

[76] Inventor: James L. Adams, 6600 East Bluebird La., Paradise Valley, Ariz. 85253

[21] Appl. No.: 744,700

[22] Filed: Aug. 13, 1991

[51] Int. Cl.$^5$ .................. G06F 15/18; G06K 9/62
[52] U.S. Cl. .................................................. 395/22
[58] Field of Search .......................... 395/23, 22, 24

[56] References Cited

U.S. PATENT DOCUMENTS 4,941,122  7/1990  Weideman ..................... 364/807

OTHER PUBLICATIONS

Hopfield, J. et al., "Computing with Neural Circuits: A Model", *Science*, vol. 233, Aug. 8, 1986, pp. 625–633.
Dehaene, S. et al., "Neural Networks that Learn Temporal Sequences by Selection", *Proc. Natl. Acad. Sci. USA*, vol. 84, May 1987, Biophysics, pp. 2727–2731.
Fukushima, K. "A Neural Network for Visual Pattern Recognition", *Computer*, Mar. 1988, pp. 65–75.
Carpenter, G. et al., "The Art of Adaptive Pattern Recognition by a Self-Organizing Neural Network", *Computer*, Mar. 1988, pp. 77–88.
Cric, F., "The Recent Excitement about Neural Networks", *Nature*, vol. 337, Jan. 12, 1989, pp. 129–132.
Lukashin, A., "A learned Neural Network that Simulates Properties of the Neuronal Population Vector", *Biological Cybernetics*, vol. 63, 1990, pp. 377–382.
Rumelhart et al., "Parallel Distributed Processing", vol. 1, MIT Press 1986.

*Primary Examiner*—Michael R. Fleming
*Assistant Examiner*—George Davis
*Attorney, Agent, or Firm*—Antonio R. Durando; Harry M. Weiss

[57] ABSTRACT

A neural network simulator that comprises a sensory window memory capable of providing a system of neuron elements with an input consisting of data generated from sequentially sampled spatial and/or temporal patterns. Each neuron element comprises multiple levels, each of which is independently connected to the sensory window and/or to other neuron elements for receiving information corresponding to spatial and/or temporal patterns to be learned or recognized. Each neuron level comprises a multiplicity of pairs of synaptic connections that record ratios of input information so received and compare them to prerecorded ratios corresponding to learned patterns. The comparison is carried out for each synaptic pair according to empirical activation functions that produce maximum activation of a particular pair when the current ratio matches the learned ratio. When a sufficiently large number of synaptic pairs in a level registers a high activation, the corresponding neuron is taken to have recognized the learned pattern and produces a recognition signal.

14 Claims, 13 Drawing Sheets

| NEURON 1, SEQ. 1 | NEURON 1, SEQ. 2 | NEURON 1, SEQ. 3 | NEURON 1, SEQ. 4 | NEURON 1, SEQ. 5 |
| --- | --- | --- | --- | --- |
| NEURON 2, SEQ. 1 | NEURON 2, SEQ. 2 | NEURON 2, SEQ. 3 | NEURON 2, SEQ. 4 | NEURON 2, SEQ. 5 |
| NEURON 3, SEQ. 1 | NEURON 3, SEQ. 2 | NEURON 3, SEQ. 3 | NEURON 3, SEQ. 4 | NEURON 3, SEQ. 5 |
| NEURON 4, SEQ. 1 | NEURON 4, SEQ. 2 | NEURON 4, SEQ. 3 | NEURON 4, SEQ. 4 | NEURON 4, SEQ. 5 |
| NEURON 5, SEQ. 1 | NEURON 5, SEQ. 2 | NEURON 5, SEQ. 3 | NEURON 5, SEQ. 4 | NEURON 5, SEQ. 5 |

FIG. 9

SYSTEM FOR SPATIAL AND TEMPORAL PATTERN LEARNING AND RECOGNITION

BACKGROUND OF THE INVENTION

1. Field of the Invention

This invention pertains to the general field of spatial and temporal pattern recognition. In particular, it provides a new and improved system for learning and recognizing information corresponding to sequences of input data, such as signals from audio or visual patterns.

2. Description of the Prior Art

Much effort has been devoted to the field of pattern recognition, especially in relation to voice and images. The development of reliable apparatus for this purpose is critical to the successful implementation of numerous robotic applications that have only been realized in rudimentary fashion to date. These include, for example, speech recognition and image recognition for direct conversion of spoken language into written text, and vice versa.

Among the various approaches followed to design effective information processors, researchers have often adopted the neural-system model for simulating the mechanisms of learning and recognizing information. See, for example, Hopfield, J. et al., "Computing with Neural Circuits: A Model," *Science*, Vol. 233, Aug. 8, 1986, pp. 625-633; Rumelhart, D. et al., "Parallel Distributed Processing: Explorations in the Microstructure of Cognition," Vol. 1, The MIT Press, Cambridge, Mass., 1986; Dehaene, S. et al., "Neural Networks that Learn Temporal Sequences by Selection," *Proc. Natl. Acad. Sci. USA*, Vol 84, May, 1987, Biophysics, pp. 2727-2731; Fukushima, K., "A Neural Network for Visual Pattern Recognition," *Computer*, March 1988, pp. 65-75; Carpenter, G. et al., "The Art of Adaptive Pattern Recognition by a Self-Organizing Neural Network," *Computer*, March 1988, pp. 77-88; Linsker, R., "Self-Organization in a Perceptual Network," *Computer*, March, 1988, pp. 105-117; and Lukashin, A., "A learned Neural Network that Simulates Properties of the Neuronal Population Vector," *Biological Cybernetics*, Vol. 63, 1990, pp. 377-382. These approaches strive to simulate the biological information processing behavior of the neural system and use mathematical models developed from vectors of relevant input data, usually through iterative adaptive techniques. These models are constructed for specific applications, rather than for a general simulation of the neural system behavior. U.S. Pat. No. 4,941,122 to Weideman (1990), for instance, describes a neural network system for processing images.

All of the methods found in the prior art utilize input data based on the absolute values of parameters that are characteristic of the information being processed. There is some evidence, though, that the biological brain processes relative values of sensory input rather than absolute values. In seeing, for example, the neural system does not process absolute levels of color and intensity; instead, the retinas of the eyes generate signals at each point within the visual field which are proportional to the value of color or intensity at that point relative to the color or intensity immediately surrounding that point. Therefore, there exists a need for a neural-system model that processes relative values of the input signals, rather than absolute values. This approach would seem to offer the degree of flexibility missing in the prior art for recognizing perceptual objects under a wide variety of environmental conditions. In addition, most existing neural-network approaches to learning patterns involve thousands of iterations, which take time and make real-time processing difficult. Therefore, it would be very desirable to have a system that is capable of learning in a single-pass process.

BRIEF SUMMARY OF THE INVENTION

It is therefore an objective of this invention to provide a system for learning and recognizing information corresponding to spatial, temporal or other patterns patterns.

Another objective of the invention is to achieve such information processing by simulating the functioning of a biological neural network.

Another goal of the invention is to process information by using only ratios of quantities, rather than individual measurements of the quantities.

A further objective of the invention is that the new information processing system be capable of implementation in real time.

Another goal of the invention is its general application and the ability to apply the same general concept in a variety of designs and physical embodiments to fit the specific characteristics of different sensory inputs and/or different output requirements.

Finally, another goal is the realization of the above mentioned objectives in a system that can be implemented with existing sensory, computing, and other harware devices.

In accordance with these and other objectives, the method and apparatus of this invention are based on a neural network simulation and comprise a sensory window memory capable of providing a system of neuron elements with an input consisting of data generated from sequentially sampled spatial and/or temporal patterns. Each neuron element itself comprises multiple levels, each of which is independently connected to the sensory window and/or to other neuron elements for receiving information corresponding to spatial and/or temporal patterns to be learned or recognized. Each neuron level comprises a multiplicity of pairs of synaptic connections that calculate ratios of input information so received. During a learning mode of operation, these ratios are recorded for patterns to be learned. During a subsequent recognition mode of operation, these ratios are compared with the previously recorded ratios corresponding to the learned patterns. The comparison is carried out for each synaptic pair according to empirical activation functions that produce maximum activation of a particular pair when the current ratio matches the learned ratio. When a sufficiently large number of synaptic pairs in a level registers an activation significantly higher than that in any other neuron, the currently sampled pattern is taken to be the one previously learned (recorded) by that neuron.

Various other purposes and advantages of the invention will become clear from its description in the specification that follows, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

BRIEF DESCRIPTION OF THE DRAWINGS

FIG. 9 shows the output of the system of the invention during the recognize mode in response to five musical sequences when no neuron had been subjected to a prior learn-mode step.

DETAILED DESCRIPTION OF THE INVENTION

In seeking to match the performance of the biological brain with a machine, the method of this invention is designed to learn a sequence of instantaneous ratios of input data transmitted from selected sources. After learning, identification is achieved when the signals received from the same sources approximate the learned ratios. It is this use of ratios, in conjunction with the specific structure of the neural network used to simulate the performance of the brain, that is the essence of this invention and provides generalization in learning an recognition.

Figure 1:
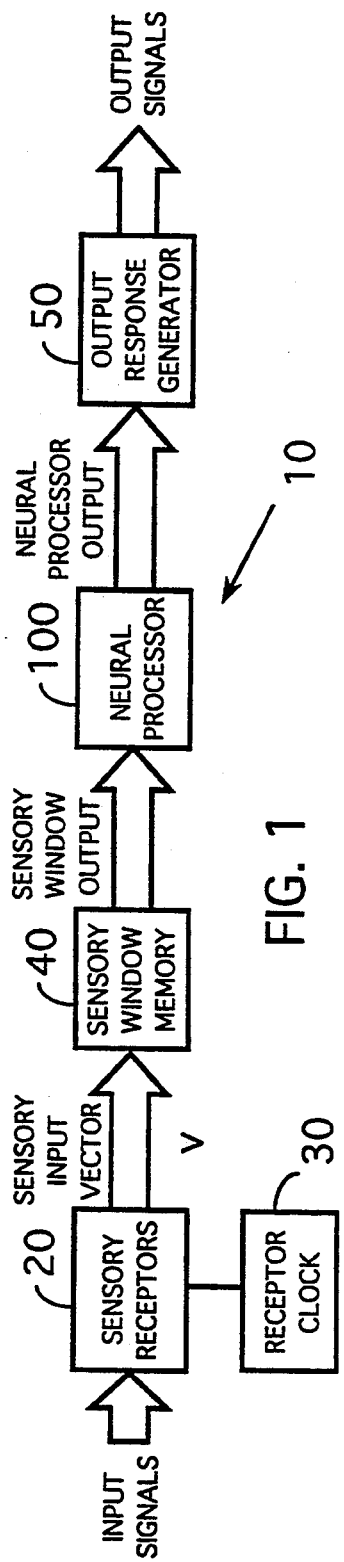
FIG. 1 is a block diagram illustrating the general configuration of the neural system of this invention for learning and recognizing spatial and temporal patterns. The system includes sensory receptors with a corresponding time control, a sensory window memory, a neural processor, and an output response generator.
Figure 2:
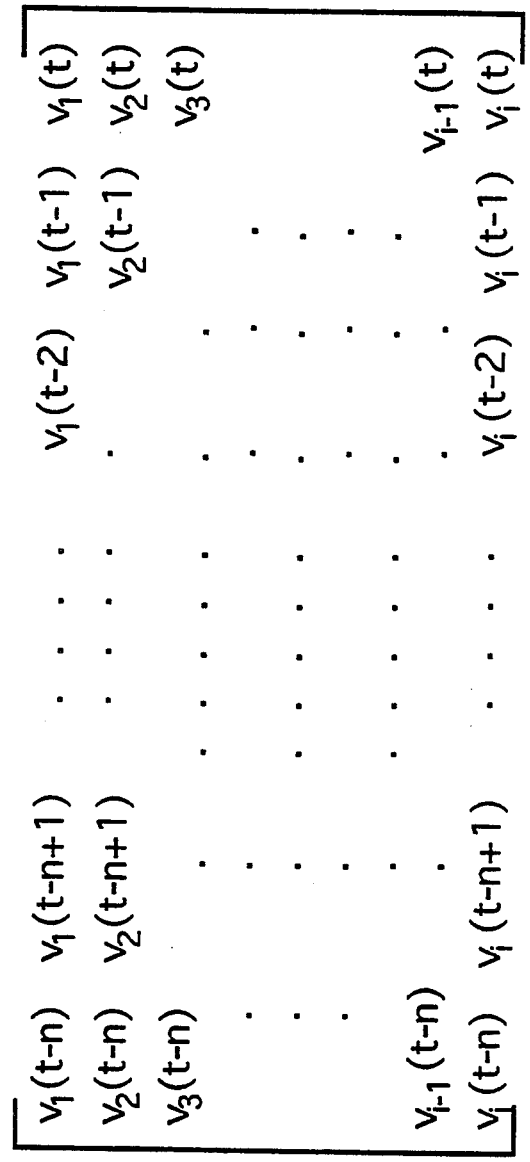
FIG. 2 is a matrix representation of the information stored in the memory of the sensory window of FIG. 1.

Referring to the drawings, wherein the same reference numbers and symbols are used throughout to designate like parts, FIG. 1 illustrates the general configuration of the neural system 10 of this invention for learning and recognizing spatial and temporal patterns. The system comprises appropriate sensory receptors 20 for measuring input signals consisting of characteristic parameters of the audio, visual or other patterns of interest at predetermined sample times controlled by a receptor clock 30. For example, the signal intensity within discrete frequency ranges may be measured at fixed time intervals to characterize a sound at corresponding moments in time. Thus, a vector of sensory input, v, is generated at each time step for transmission to a sensory window memory 40, where the vector is recorded and stored for a predetermined number of time steps, so that a corresponding history of such sensory input is retained in the memory. FIG. 2 is a matrix representation of the data stored in the memory of the sensory window 40, containing n+1 vectors of sensory input measured at n+1 moments in time separated by n discrete time steps. Each vector, $v=(v_1, v_2, \ldots v_i)$, represented by a column in the array, corresponds to i entries of input data characteristic of the pattern of interest and measured at a given moment in time, as predetermined and controlled by the clock 30. The data in the matrix correspond to n+1 sensory input vectors transmitted to the memory at n+1 moments in time and constitute a current sensory window for the system to access information measured by the sensory receptors during the last n+1 time steps. Thus, the vector v(t) corresponds to the sensory input transmitted to the sensory window at time t, the vector v(t−1) corresponds to the sensory input transmitted to the sensory window at time t−1, and so on for all n+1 moments of time, including the last and the immediately prior n sensory input vectors so transmitted. As new data vectors are measured and transmitted by the sensory receptors 20 at successive moments in time (t+1, t+2, etc.), the oldest sensory input vectors (v(t−n), v(t−n+1), etc.) are correspondingly dropped from the array, so that at any given time the sensory window 40 contains all the sensory input data generated during the time covered by the last n time intervals. Each row (1 through i) in the array represents a history of a specific measure of the pattern of interest. Obviously, the number of rows in the array is related to the number of characteristic parameters (modalities and submodalities) required to represent the pattern of interest, and the number of columns is related to the degree of temporal definition deemed necessary for the system's ability to learn and recognize that pattern. For example, modalities might involve vision, audition, and touch; submodalities may be intensity, frequency, duration, and orientation.

Figure 3:
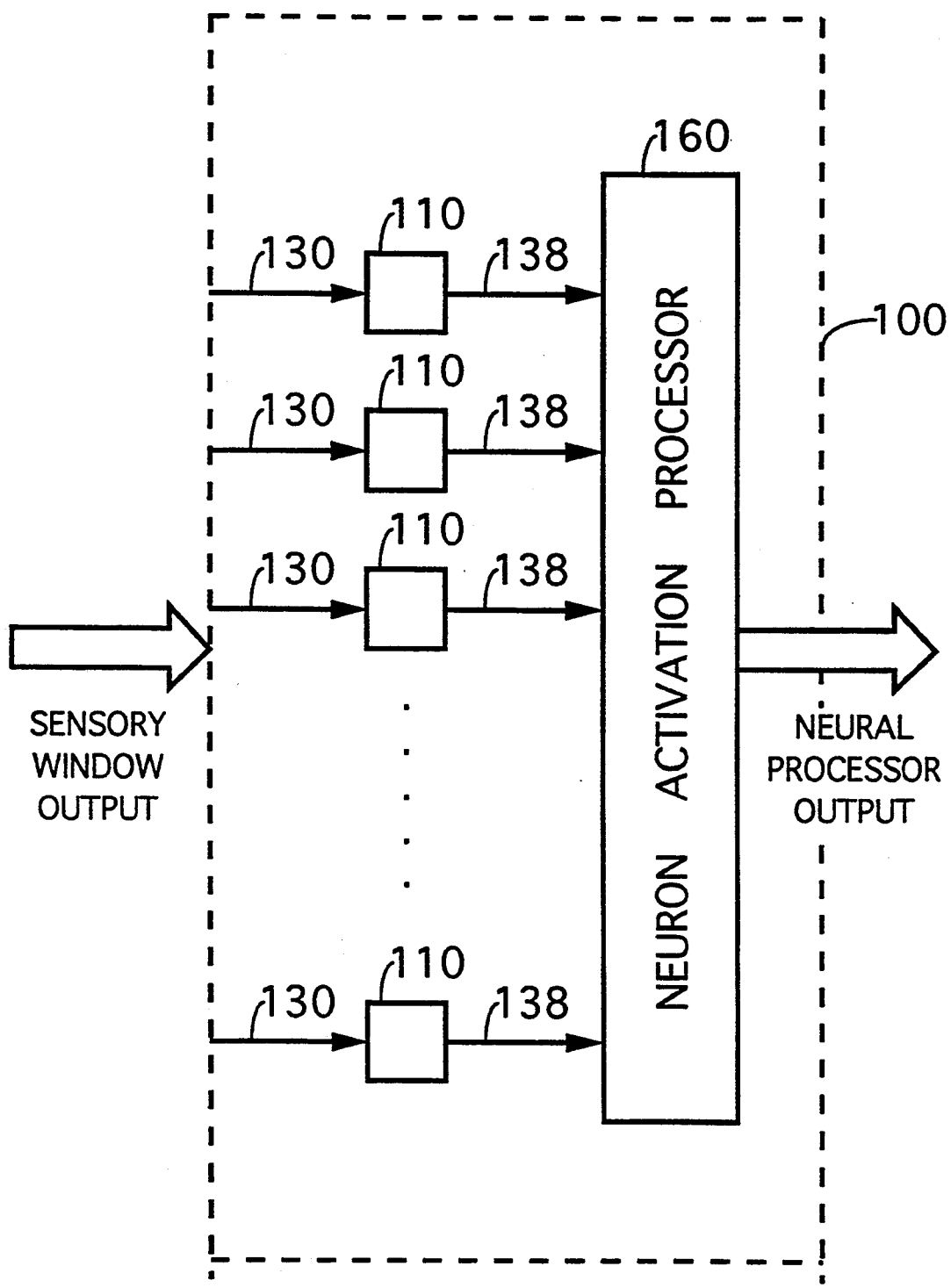
FIG. 3 is a block diagram of the neural processor shown in FIG. 1, illustrating the connections among neurons and between neurons and the sensory window.

FIG. 3 is a block diagram of the neural processor 100 of FIG. 1 illustrating the connections between neurons and the sensory window 40. The neural processor consists of a multiplicity of neurons 110 connected to the sensory window for the reception of information through multiple neural connections 130. Each connection 130 represents the ability to transmit multiple pieces of data from a source within the sensory window to a neuron. Thus, for example, a connection 130 between the sensory window and a neuron allows that neuron to receive a specific number of pieces of information within the sensory window according to paths connecting the neuron to specific elements in the matrix constituted by the memory in the sensory window. Once specific neural connections 130 (and paths to specific matrix elements within each connection) are established (according to criteria explained below), the connections and paths remain fixed for the system. Each neuron produces an output (neuron activation) that is transmitted to a neuron activation processor 160 through neuron output connections 138. The neural activation processor generates a signal, as detailed below, constituting the neural processor output transmitted to the output response generator 50, which in turn generates output signals corresponding to the identification of learned patterns.

Figure 4:
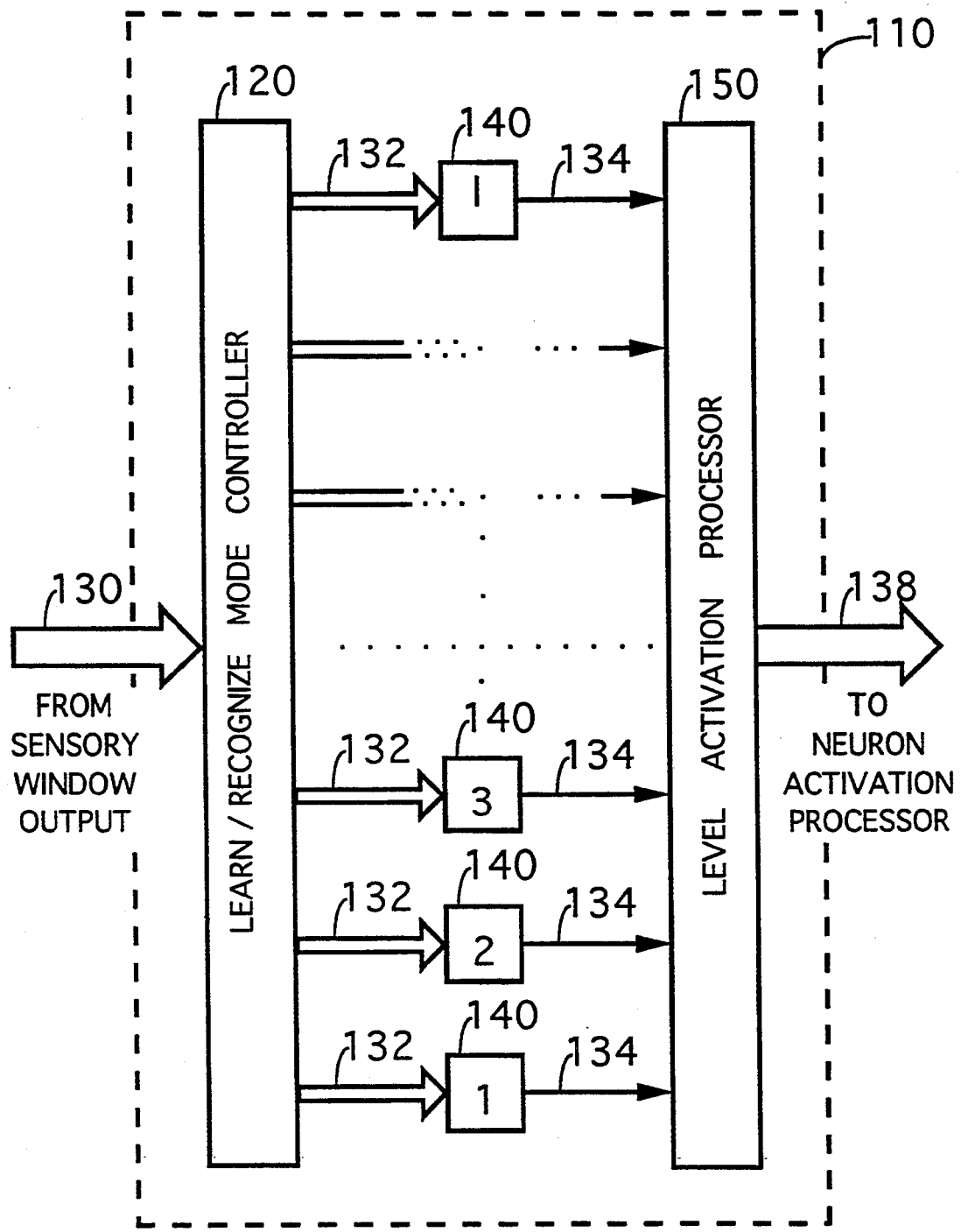
FIG. 4 is a schematic representation of the structure of each neuron within the neural processor of FIG. 3, illustrating the multiple level configuration of each neuron.

FIG. 4 is a schematic representation of the structure of each neuron 110 within the neural processor 100. Each neuron consists of multiple levels 140 (shown, for example, as 1 through l), each independently coupled to its corresponding neural connection 130 through a learn/recognize mode controller 120. Because of the direct tie of each neuron 110 with the sensory window 40 through the set of connections 130, the sensory window output is always available in its current form, as updated at each time step, to all neurons in the neural processor 100. The size of the time steps controlled by the receptor clock 30 (and therefore the frequency of sampling of the audio/visual signals) is selected to provide sufficient data for the system to operate efficiently. Of course, a higher frequency of transmission results in a higher definition of the information to be stored and recognized, but it also requires more storage for additional neuron levels and greater processing speed for on line operation. The flow of information through 130 from the sensory window is controlled by the learn/recognize mode controller 120 in a way that allows transmission at predetermined time intervals to different levels 140 within each neuron depending on whether the system is operating in a learning or a recognizing mode. The details of this controlling function will become more apparent from the description of the operation of the system discussed below. In general, though, the mode controller 120 determines the flow of information to the various neuron levels 140 through corresponding neural channels 132, which may or may not be open (as determined by the mode controller) depending on the mode of operation and the chosen time interval for operation. Each level produces an output (level activation) that is transmitted to a level activation processor 150 through level output connections 134. The level activation processor in turn generates a signal, as detailed below, contituting the neuron output transmitted to the neuron activation processor 160.

Figure 5:
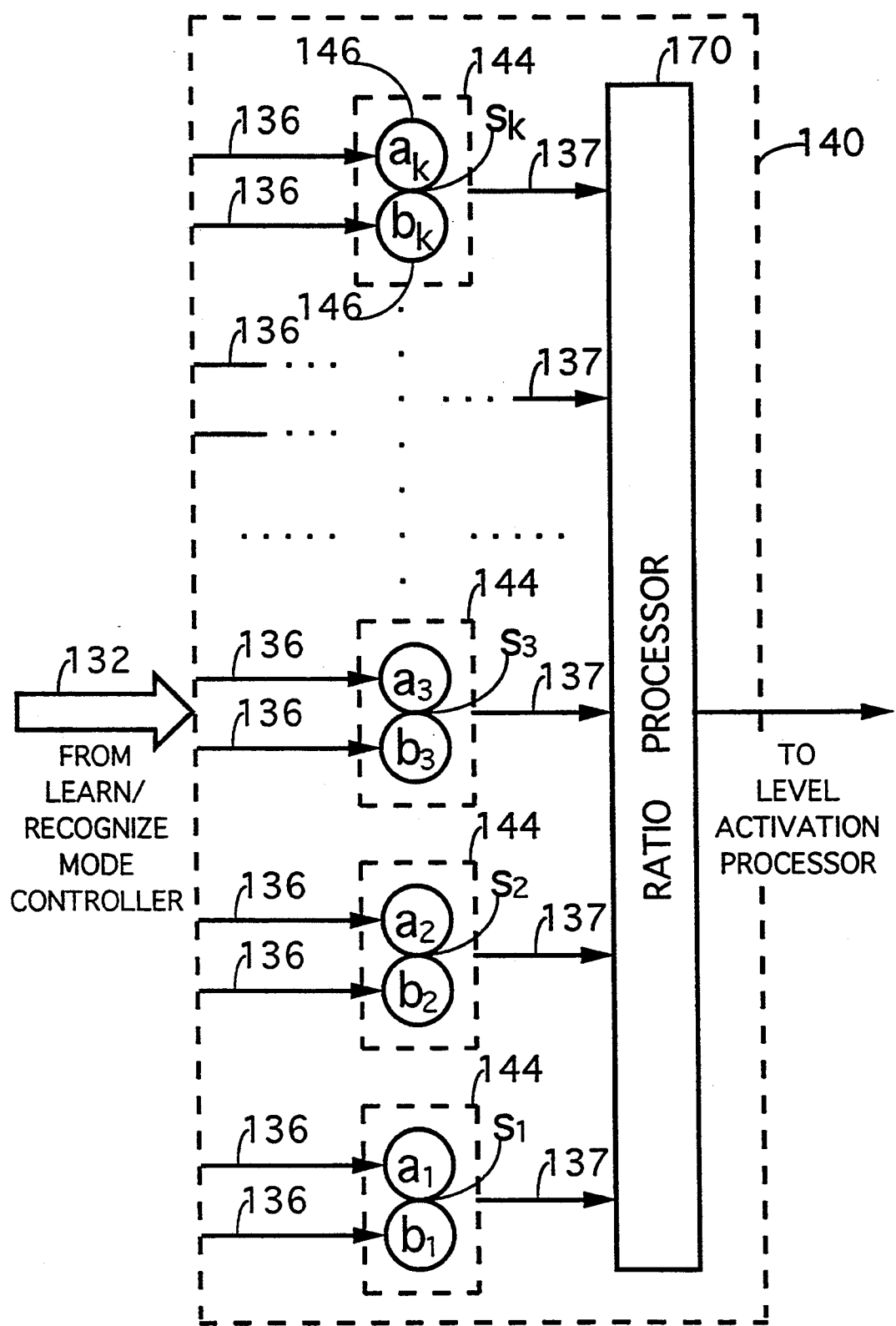
FIG. 5 is a schematic representation of the structure of each neuron level of FIG. 4, illustrating synaptic pairs and their connections within the neural processor.

FIG. 5 is a schematic representation of the structure of each neuron level 140 and of its internal connections between the corresponding neural channel 132 and a multiplicity of connection points, or synapses, 146. Each neuron level comprises a number of pairs 144 (shown as $S_1$ through $S_k$ for illustration) of individual synapses 146, where each synapse is connected to the neural channel 132 by means of a single synaptic connection 136. Thus, each synaptic pair is characterized by two synapses (labeled a and b within each pair) individually connected to the sensory window through a path contained in the corresponding neural connection 130, neural channel 132, and synaptic connection 136. Each synaptic pair 144 produces an output (ratio) that is transmitted to a ratio processor 170 through a corresponding synaptic output connection 137. The ratio processor in turn generates a signal, as detailed below, constituting the level output transmitted to the level activation processor 150 through the level output connection 134.

For the most part, the signals received at each time interval by each synapse through its synaptic connection 136 represent the amount of some quantity measured either currently or in the immediately past n time steps by the sensory receptors 20 and stored in the sensory window 40. A large value indicates a large amount of something and a small value indicates a small amount of something. The choice of connections is random and each pair receives connections that may be from different times (i.e., from different columns in the array of FIG. 2) within a single sensory submodality, geared to the empirical optimization of the performance of the system. However, once the choice is made and learning occurs, subsequent recognition of the learned patterns depends upon the connections remaining the same as they were during learning. Note that although each synaptic pair 144 has only two fixed connections (one for each synapse 146 of the pair), each element of the sensory window memory matrix will typically be connected with multiple levels of multiple neurons.

The signals arriving simultaneously at a synaptic pair at any time interval need not, and often should not, represent signals generated elsewhere at the same instant in external time. However, the external-time lag difference between the two should remain fixed during and after learning in order to permit recognition. According to the preferred embodiment of the invention, each synapse is assigned a pointer to a row and a pointer to a column of the sensory window matrix to establish a fixed connection with a specific element in the array. These pointers are generated semi-randomly and remain fixed thereafter. The term semi-randomly is used because a constraint is imposed on the otherwise random assignment of connections. That is, both members of each synaptic pair receive signals from the same submodality of information. For instance, if one member of the pair samples the tonic activity at a particular frequency, then the other should sample the tonic activity at a different frequency with some random time interval between the two; or both should be connected to different frequencies of tonic activity measured at the same time. Thus, although the signals activating both members of a synaptic pair come from the same submodality (e.g., both represent color or both represent sound frequency or both represent intensity or both represent duration), they should represent different qualities within that submodality or the same quality at different points in time and/or space. For example, one may represent green-ness, another yellow-ness; one may represent the intensity of one sound frequency and another may represent the intensity of another sound frequency. One may represent the green-ness at one point in space and the other represent the green-ness at another point in space. One may represent the intensity of a particular frequency at one point in time and the other the same frequency at a slightly different point in time. There is no pairing of "apples and oranges," though. For example, there is no pairing of green-ness with the intensity of the musical note middle C (440 Hz). The reason for avoiding such cross-modality pairings is simply one of practicality; such pairings across independent modalities and submodalities are not likely to lead to useful identifications. It is useful, however, to combine (by summation, as explained below) the ratio responses from several submodalities to achieve the response of a single level. That is, for example, the response to duration ratios may be summed with the responses to frequency ratios. Further, it is anticipated that, as the implementation of the invention progresses to higher levels of recognition, it may become reasonable to determine ratios between different modalities for some overall identification. An example is the association of the frequency characteristics of a person's voice with the spatial characteristics of the person's face.

At all time intervals, ratios of the most recent inputs to all synaptic pairs of all levels of all neurons are calculated. Thus, for each time step determined by the receptor clock 30 and subject to the information flow control determined by the mode controller 120, each neuron in the system produces a set of ratios R of values which can be organized according to a corresponding synaptic ratio matrix 150 shown in FIG. 6. Each row in the matrix corresponds to a neuron level (1 through l, as illustrated in FIG. 4) and each element in a row corresponds to a synaptic pair within that level (1 through k, as illustrated in FIG. 5). Thus, for example, at any given time, $R_{21}$ is the ratio calculated from the synaptic pair $S_1$ in level 2 of the neuron.

Although the information to calculate these ratios is available at all time steps to all synapses in each neuron through the various connections to the sensory window, during learning only one-level snapshots of ratios are taken at predetermined time intervals and stored sequentially, one level at a time, in selected neurons. That is, at some instant the ratios at level 1 are calculated and stored. After a predetermined recording interval of time (not necessarily equal to, and normally a multiple of, the time step determined by the receptor clock 30), the ratios at level 2 are calculated and stored. A recording interval later, level 3, and so on until the end of the available information to be learned or the utilization of all available levels. The sequential availability of information to the appropriate levels is controlled by the mode controller 120.

Broadly speaking, after it has learned, each neuron acts as a specialized detector, a recognizer, of the conditions it has learned. In the post-learning recognition mode of operation, the current ratios at any given time are compared with the ratios which have been learned and the relative match between the ratios is quantified by a corresponding activation for each synapse and for the neuron. The contribution of a particular synaptic pair to the activation of a neuron reflects the degree to which that pair receives signals whose relative strengths conform to their previously recorded (learned) ratio. A perfect match of encountered and learned ratios for all synaptic pairs on a single level at any instant gives a maximal activation for that instant. Greater or lesser ratios than those learned both result in lesser activations. For efficiency, it is important to avoid having both members of a synaptic pair point to the same location in the sensory window matrix because that would yield a never-changing constant activation (due to the recurring ratio of a quantity to itself).

Figure 6:
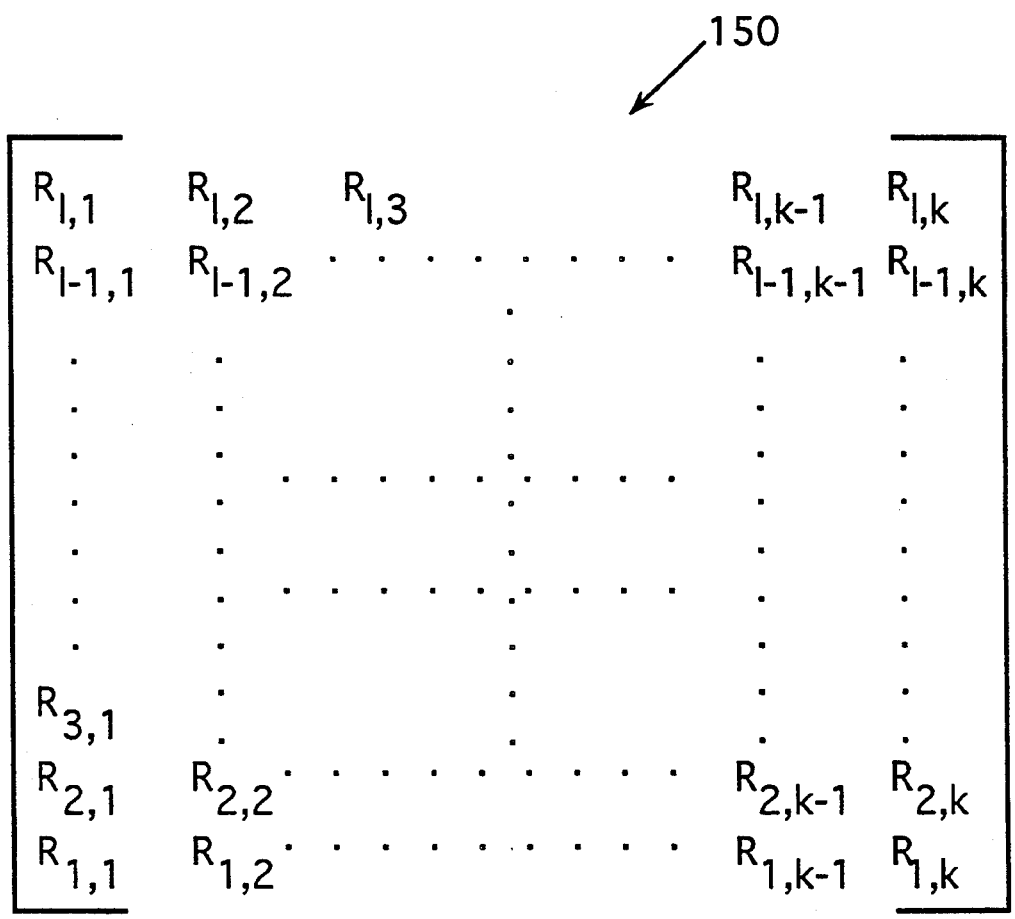
FIG. 6 is an illustration of the synaptic ratio matrix corresponding to a neuron comprised of l levels, each of which contains k synaptic pairs.

So far ratios have been discussed as if they were just the division of one number by another. While such divisions could be used, the comparison of current ratios with learned ratios suggests a Gaussian tuning curve. On that basis, the preferred embodiment of this invention is implemented by using differences of logarithms instead of ratios of values (since the difference of the logarithms of two values is equivalent to the logarithm of the ratio of the two). Therefore, each element R of the synaptic ratio matrix shown in FIG. 6 is calculated at all times at each synaptic pair 144 either by the equation $$R_{ab} = \ln A - \ln B, \tag{1a}$$

or by the equation $$R_{ba} = \ln B - \ln A, \tag{1b}$$

where A and B are the current values of the signals received by the synapses a and b, respectively. Note that each synapse, a and b, is permanently connected to a different source point in the sensory window; therefore, it does not matter whether the ratio A/B or B/A is calculated, so long as the same ratio is maintained after learning. The ratios so calculated are fed to the ratio processor 170 through the synaptic output connections 137.

The comparison of the learned ratio with the current ratio in each synaptic pair is achieved by a further differencing of logarithms, which could yield either a positive or a negative number. In order to always obtain a positive value that is maximal when the difference is zero and that decreases for both increasingly negative and increasingly positive differences, the use of a Gaussian is a logical choice, although other techniques might be used. Thus, after learning, the instantaneous activation of a synaptic pair is defined at all measured points in time as the quantity calculated by the equation $$P_{ab} = K_1 e^{-K_2[R_{ab}-(\ln A_0 - \ln B_0)]^2} \tag{2a}$$

or the equation $$P_{ba} = K_1 e^{-K_2[R_{ba}-(\ln B_0 - \ln A_0)]^2} \tag{2b}$$

where $P_{ab}$ and $P_{ba}$ represent the activation of a synaptic pair recording either the ratio a/b or b/a, respectively; $K_1$ and $K_2$ are empirical constant coefficients; $A_0$ and $B_0$ are the values of the signals received and recorded by synapses a and b, respectively, during learning; and $R_{ab}$ and $R_{ba}$ are the current ratios calculated according to Equations 1a or 1b, as applicable to the particular synaptic pair. Thus, the activation for each pair of synapses receiving signals at any given time is calculated by Equation 2a or 2b, as applicable, and stored by the ratio processor 170.

When a pattern is to be learned, an arbitrary unused neuron is selected, an identification code corresponding to the particular pattern is assigned to it, and recording is initiated. As mentioned above, the recording process advances level by level, starting with level 1. In the first cycle of recording, a snapshot of the ratios calculated from Equation 1a or 1b of each synaptic pair in level 1 is recorded, one ratio for each pair. After a recording time interval, a snapshot is taken of, and stored for, the ratios in level 2, and so on until there are no more levels remaining in the neuron or until the pattern/sequence to be learned has been completed. As described, the ratios are stored as the differences between logarithms of the signals received. Thus, during learning, k values (corresponding to the number of synaptic pairs in each level) of synaptic pair ratios $R_{ab}$ (or $R_{ba}$) are calculated and stored at each recording time interval for one neuron level, and the process is repeated at succeeding recording time intervals for sequentially higher neural levels. After l time steps, all synaptic pairs of every level of the learning neuron will have learned a ratio corresponding to the particular pattern to which the neuron was exposed.

After learning, the ratios (differences of logarithms) are continuously (at each time step) calculated for all synaptic pairs and corresponding synaptic activations are also concurrently calculated by the ratio processor 170 according to Equations 2a or 2b, as applicable. The activations for each synaptic pair on each neural level are also summed together in the ratio processor to obtain a level activation L, according to the equation $$L = \sum_{j=1}^{k} P_{ab}(j) \text{ or } P_{ba}(j), \text{ as applicable.} \quad (3)$$

The level activations so calculated are transmitted to the level activation processor 150 through the level output connections 134 for further processing. Thus, at every time step, each neuron produces l values of level activation L, each of which varies between zero and $kK_1$ (i. e., k synaptic pairs times $K_1$, the maximum possible activation for each pair), depending on how close the current ratios $R_{ab}$ (or $R_{ba}$) are to the corresponding learned ratios. Therefore, the greater the activation L of each neural level, the closer the ratios received by that level are to a learned pattern; which, in turn, is used to quantify the level of recognition of that pattern and to produce a corresponding output. For example, the neuron may be programmed to produce a predetermined signal when its activation reaches a certain threshhold activation value, $N_0$.

That signal, transmitted as a neural processor output, could in turn be used in a variety of ways obvious to those skilled in the art to generate additional outputs (such as audio and visual signals) in the output response generator 50 appropriate for identifying the recognized pattern.

One might be tempted to restrict recognition of a pattern to the same sequential progression learned up the levels, triggered by the first appearance of the pattern. But such restrictiveness could be problematic. For example, since spatial and temporal patterns may be encountered in fragments as well as in complete wholes, allowance needs to be made for recognizing the fragments while still restricting spatial or temporal relationships. Therefore, in order to achieve improved performance and add flexibility to the invention, the concepts of integration and of spatiotemporal summation are introduced.

Integration refers to the idea of using information generated over a period of time, rather than simply information generated at each time step, in order to measure the activation of each neuron. So, instead of utilizing the level activations L generated at each time step, such activations for each level are added by the level activation processor 150 over a number of time steps corresponding to a chosen integration period and the sum is then used for further computation. For example, if an integration period equal to five time steps is chosen, an activation is calculated at each level for each time step and the five values so generated during the corresponding integration period are added to yield a level activation for that integration period. This integrated level activation, which will be referred to a $L_{Int}$, is then used for further calculations at the end of each integration period. Thus, the integrated level activation is calculated by the equation $$L_{Int} = \sum_{t=1}^{i} L(t) \quad (4)$$

Where i is the chosen number of time steps per integration period.

As implemented in the preferred embodiment of the invention, spatiotemporal summation consists of summing half of the activation of a particular level for the current integration period with half of the activation of the immediately lower level at the immediately prior integration period. That is, for instance, the activation of level m (between 1 and l, as illustrated in FIG. 4) at integration time t is calculated as one-half the activation on that level at that time plus one-half the activation of level m−1 at integration time t−1, corresponding to one integration period before. This is done for all levels at each integration period, resulting in a more gradual and progressive recognition response than using singular activations for each time step.

As an illustration of spatiotemporal summation, suppose that at integration time t−1, the activations of a neuron are all zero. During one of the time steps between integration time t−1 and integration time t, a previously-learned sequence is encountered somewhere near its middle, which results in maximal activation, $kK_1$, of level m of the neuron. Thus, at integration time t, level m contributes $(\frac{1}{2} \times 0) + (\frac{1}{2} \times kK_1) = \frac{1}{2} kK_1$ to the activation of the neuron. Further suppose that this previously-learned sequence triggers again maximal activation, $kK_1$, in the succeeding levels of the neuron during succeeding integration periods. Then, at integration time t+1, the contribution from level m+1 is $(\frac{1}{2} \times \frac{1}{2} kK_1) + (\frac{1}{2} \times kK_1) = \frac{3}{4} kK_1$. At integration time t+2, the contribution from level m+2 is $(\frac{1}{2} \times \frac{3}{4} kK_1) + (\frac{1}{2} \times kK_1) = \frac{7}{8} kK_1$. At integration time t+3, level m+3 gives 15/16 $kK_1$. Thus, the neuron can quickly deliver near-maximal output in response to a fragment of a known sequence even through this spatiotemporal summation process. If, in response to an unfamiliar sequence, maximal activations randomly occur on non-successive levels of a neuron, the described spatiotemporal process yields results about half of that for maximal activation of successive levels. Generally, though, unfamiliar sequences do not contain enough of the learned ratios to cause maximal activations in any order of levels.

Thus, spatiotemporal summation is applied currently in integration time by combining a fraction of the integrated level activation, $L_{Int}$ (the sum of level activations at each time step), during each integration period with a complementary fraction of the integrated level activation for the immediately lower level obtained at the immediately previous integration period. In the example given above, both fractions were $\frac{1}{2}$ (i.e., one-half of the activation for the current neuron level and integration period plus one-half of that for the next prior level and period). The same fractions were used for the examples illustrated below. Nevertheless, different fractions, corresponding to different weights assigned to each integration period, could similarly be used in equivalent fashion. For level 1, the fractions for the current and prior times were both taken of the same level 1 activation.

As a result of these computations, a weighted value, $L_{Int}$, of each integrated level activation $L_{Int}$ is calculated. Therefore, l new $L_{Int}$ values (one for each level)

are transmitted to the neuron activation processor 160 through the neural output connections 138 at each integration period. A preliminary neural activation $N_{Int}$ for that integration period is then taken as the maximum value of all of the individual weighted level activations $L_{Int}$ for the neuron; that is $$N_{Int} = \max L_{Int} \tag{5}$$

for each neuron. There is some biological justification for choosing the maximum value of the levels rather than the sum of all level values for the neuron, but the practical reason for such choice is that it gives better results. The output neural activation $N^*_{Int}$ from each neuron at any particular integration time is then calculated in the neural activation processor 160 by finding the arithmetic average $\bar{N}_{Int}$ of all preliminary neural activation values $N_{Int}$ (over all neurons in the system), by subtracting that average from each of the individual preliminary values, and by setting negative differences equal to zero. That is, $$N^*_{Int} = N_{Int} - \bar{N}_{Int}, \text{ if 0 or positive} \tag{6a}$$

and $$N^*_{Int} = 0, \text{ if negative} \tag{6b}$$

This set of equations is applied to each neuron. The net result of this process is that the neuron which has previously learned the currently presented pattern delivers a high activation value throughout the presentation of the pattern and all other neurons yield nearly zero values. Finally, all output neural activations so calculated are compared to the threshhold value $N_0$ and a neural processor output $N_{Out}$ is determined by applying the following equation to each neuron in the system:

$$N_{Out} = N^*_{Int} - N_0. \tag{7}$$

The identification of the pattern is determined by the presence of at least one neuron that gives a high activation value (greater than the empirically chosen threshhold value $N_0$). For temporal patterns, such as the tunes used in the examples below, identification cannot be strong until a few notes have been presented. This mirrors human experiences and is to be expected.

Figure 7:
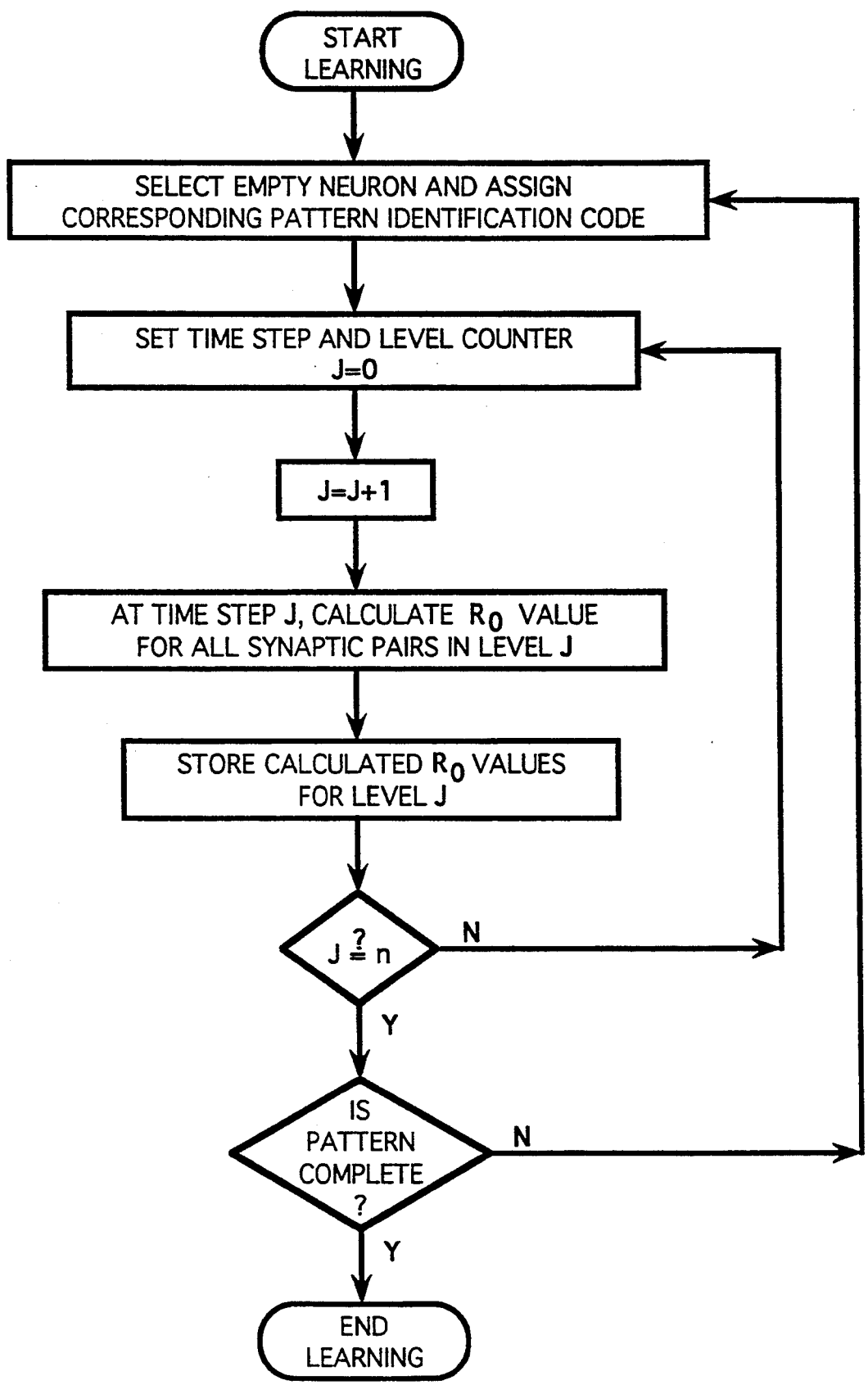
FIG. 7 is a flow chart of the steps taken during the learn mode of the invention.

The sequence of steps described above is illustrated in the flow charts of FIGS. 7 and 8 for the learn and recognize modes, respectively, as determined by the learn/recognize mode controller 120. The data that are periodically transmitted and stored in the sensory window 40 by means of sequential sensory input vectors v, are contemporaneously transmitted to the neural processor 100 via the connection paths described above between individual elements v of the sensory window matrix and each synapse 146. As shown in FIG. 7, when learning starts for a pattern of interest captured by the sensory receptors 20, an empty neuron (one that has not yet recorded a learned pattern) is selected and every pair of synapses in the first level of that learning neuron receives two signals from the sensory window matrix and calculates a corresponding ratio $R_0$, according to either Equation 1a or 1b, depending on whether the A/B or the B/A quantity is measured, respectively. The ratios for all synaptic pairs in the first level are stored and become the learned material for that level. After a recording time interval, the same procedure is repeated for level 2, and so on until all levels have calculated and recorded a corresponding set of learned ratios. If the pattern to be learned is still active in the exterior world, so that more space is needed to recorded, a new empty neuron is selected and the process is continued until the pattern is exhausted.

Figure 8:
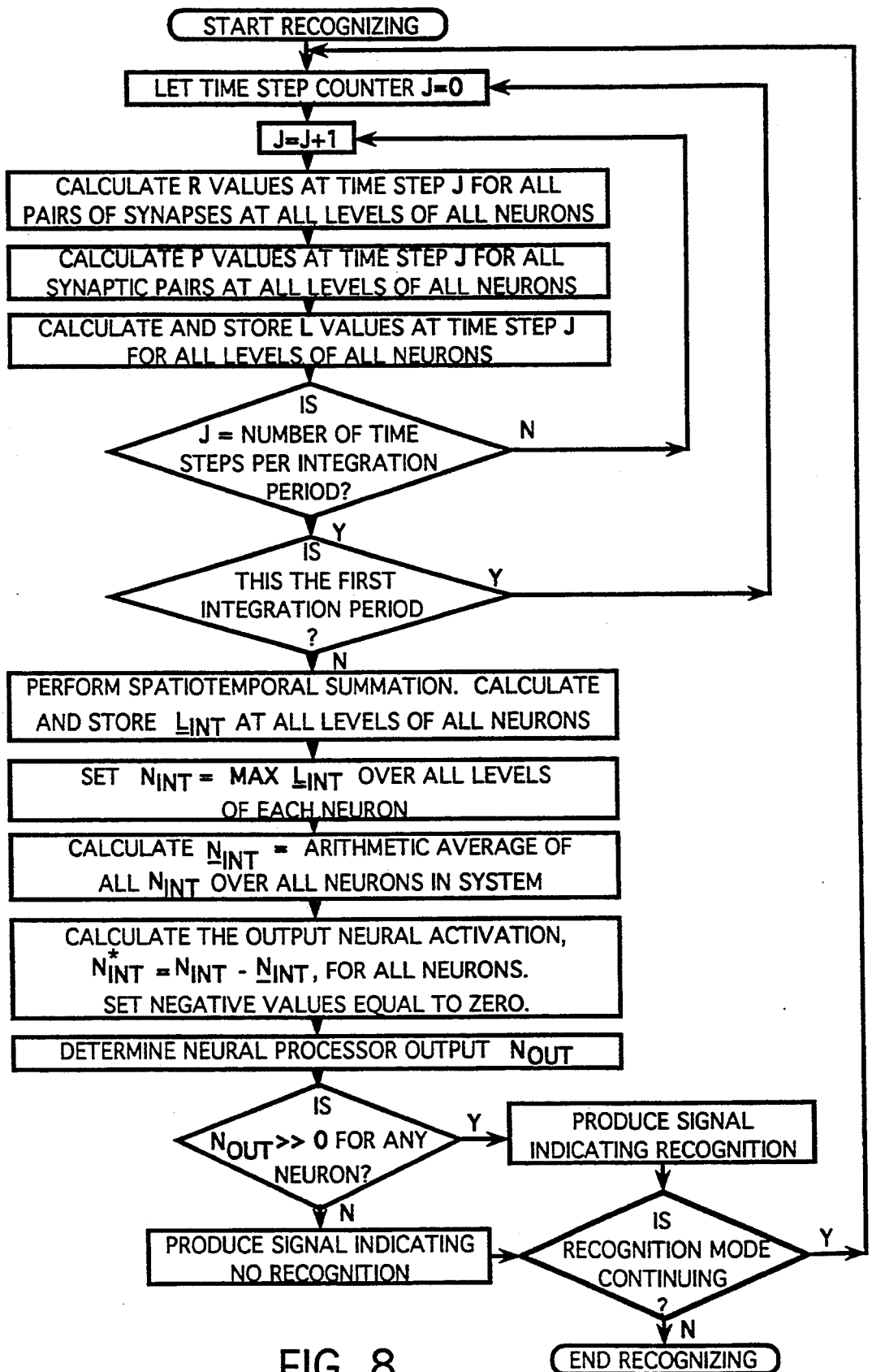
FIG. 8 is a flow chart of the steps taken during each integration period of the recognize mode of the invention.

During each integration period in the recognize mode of operation, as illustrated in the diagram of FIG. 8, current ratios R of the signals received are calculated (according to Equations 1a and 1b, as applicable) at each time step for all pairs of synapses of all levels of all neurons. Corresponding synaptic activations P and level activations L are also calculated at each time step from Equations 2a or 2b, as applicable, and Equation 3. Each level activation so generated is stored. This process is repeated for a number of steps corresponding to the chosen integration period. After a number of time steps equal to an integration period, the level activations for the period are added to obtain integrated level activations $L_{Int}$ (according to Equation 4) for each level and these values are stored. The process is continued through the end of the second integration period when a second set of integrated level activations is generated. Then, spatiotemporal summation is performed at all levels with the values so calculated.

At the end of each integration period, a preliminary neural activation $N_{Int}$ is set for each neuron equal to the maximum of all integrated level activations for the neuron (Equation 5). Then, the arithmetic average $\bar{N}_{Int}$ of all preliminary neural activations is calculated and the difference $N^*_{Int}$ between each and the average is computed, setting all negative values equal to zero (Equations 6a and 6b), and assigned to each neuron as its output neural activation. Finally, all output neural activations are compared to a threshhold value $N_0$ (Equation 7) to determine the neural processor output $N_{Out}$. If the output neural activation of any neuron is larger than the threshhold value and significantly larger than that of the other neurons for a repeated number of integration periods, that neuron is taken to have recognized the pattern that it learned during the learn mode and an appropriate signal is transmitted to indicate recognition by that neuron and the portion of the pattern currently recognized. If the output neural activation of all neurons is smaller than the chosen threshhold, an appropriate signal indicating no recognition may similarly be transmitted.

It is clear that the system and method so described could be obviously modified by those skilled in the art to include connections among neurons, rather than only between neurons and the sensory window. These connections could be used to transmit signals that result from some internal process within each neuron. This information could be either transmitted directly to neural synapses or channeled through the sensory window, like the information conveyed through the sensory window vectors. It is anticipated that such additional data could become useful for the recognition of more complicated patterns.

Similarly, the method could be expanded in obvious ways to have parallel learning by multiple neurons at the same time, rather than sequential learning, as illustrated above. This would be accomplished by simply contemporaneously connecting more than one neuron, through mode controller 120, during learn mode operation.

The functioning of the system of this invention is best illustrated by the following examples, wherein the system was tested with numeric representations of five simple musical pieces up to 73 notes in duration. A FORTRAN program was developed to simulate the operations of the system during learning and recognition of temporal patterns (simulated played music) of the pieces. The numbers of system elements (neurons, levels, synapses) and the extent of the data processed were kept to a minimum for purposes of demonstration and are not meant to approach the complexity required for commercial applications. The listing of the FORTRAN program containing the specific features of the system used for these examples is attached as Appendix A. This program is suitable for being run on a general purpose computer.

The musical sequences used for these examples were randomly selected from beginners books of recorder music. The specific tunes used were "Eine Feste Burg ist Unser Gott" by Johann Sebastion Bach; "Hatikva," a Hebrew anthem; "Mariner's Hornpipe," by an anonimous author; "Never Weather-Beaten Sail" by Thomas Champion; and "Melody from Sonata in F Major" by George Frederic Handel. Each note was converted to a number (simulating the function of the sensory receptors 20) and that number was presented to and stored in the sensory window memory (40). Such numbers were repeated for an arbitrary number of time steps. For example, an eighth note usually lasted for 8 time steps, but other playing rates were also used as a test of the ability of the system to recognize a tune played at a rate different from the rate at which it was learned.

In each simulation, fifteen rows of the sensory window matrix were assigned to tonic activity of fifteen different possible input frequencies (a first submodality). That is, as long as a note was playing, the elements of each of the fifteen rows in successive columns of the array were set to values representing the activity of a particular frequency. A column shift was set to occur after each time step, corresponding to a brief interval of time, as outlined below. Another fifteen rows were assigned to reporting the most recent ON durations of notes at each of the 15 different frequencies (a second submodality). That is, each row in this group recorded a number equal to the number of time steps corresponding to the duration of the note last appearing in that frequency. Finally, an additional fifteen rows were assigned to reporting the most recent OFF duration of those same frequencies (a third submodality). That is, each row in this group recorded a number equal to the number of time steps corresponding to the period during which no note last appeared in that frequency. The sensory window memory matrix (called "axon delay line array" in the program listed in Appendix A) was sized to contain 128 columns, so that data corresponding to 128 time steps could be available through the sensory window at any given time. Thus, the size of this matrix (45×128) was sufficient for two musical measures at 4/4 time where each column represented a duration equal to that of one-eighth of an eighth note. At any instant in time, signals representing up to several seconds of elapsed time, sampled at regular intervals, were flowing through the sensory window array.

For the tonic frequency activities of the examples, the row representing a frequency currently active was supplied with a maximal input value and the other 14 rows of tonic input were supplied with lesser values with a Gaussian distribution centered on the maximally-activated row and dropping off such that a row ten rows away was activated about one-tenth as much as the maximal row. This approach was taken so that the ratios of any two such values would be more specific than just various ratios of "all" and "nothing," which would not be representative of the real world.

Each tune was coded as four vectors. Vector 1 contained letters for the notes on the musical staff (i.e., "a" through "g" and "r" for a rest); vector 2 contained an octave parameter (the octave from middle C to the next C above it was treated as octave 1); vector 3 specified whether each note was natural ("n"), sharp ("s"), or flat ("f"); and vector 4 gave the duration of the note, or rest, in eighth notes (these simple tunes had no notes shorter than eighth notes). During the simulation, the first three input vectors were converted to a single number representing a frequency (ranging from 1 to 15) per time step. Including the sharps, flats, and natural notes, 12 different frequencies per octave were so quantified by a number. Each number was repeated for as many time steps as there were time steps per eighth note multiplied by the duration of the note in eighths (obtained from the fourth input vector).

In each example, only one neuron with 112 levels was used. Each neural level contained twelve synaptic pairs. Four of these pairs processed ratios of tonic frequency activities, four processed ratios of last ON durations, and four processed ratios of last OFF durations (the three submodalities). Within these restrictions, randomly different pointers were assigned from the sensory window matrix to each synaptic pair by linking each synapse to a row and a column of the matrix. These pointers were generated semi-randomly (within the same modality) and remained fixed thereafter. So, if one member of a pair sampled the tonic activity at a particular frequency, the other would sample the tonic activity at a different frequency with some random time interval between the two.

For the purposes of these examples, the constant coefficients of Equations 1 and 2 were chosen empirically to optimize the performance of the system for learning and recognizing musical sequences. It is clear that different coefficients would optimize the system for different patterns, but they could easily be found by calibrating the performance of the system with analogous patterns. The following specific coefficients were used for the examples:

$$K_1 = 10,000$$

$$K_2 = 0.1$$

$$N_0 = 0$$

During the learning mode of the examples, one musical sequence was assigned to an unused neuron. After each of the tunes was learned by a different neuron according to the method of the invention, as detailed above, each tune was similarly presented (played) for identification to all neurons simultaneously. If each neuron that had learned a tune responded preferentially to that particular tune and hardly at all to the others, this was taken as an indication of the system's capacity for identification, which was found to exist in all cases.

FIGS. 9–14 illustrate the results of these examples. Each figure shows graphs of the recognize-mode output of each of the five neurons used in the examples while each of the five musical sequences was being played under different conditions. FIG. 9 shows such output when no neuron has been subjected to a prior learn-mode step. That is, all neurons were exposed to each tune in the recognize mode without having first learned any of the tunes. As is evident from the graphs, all neurons gave very little output in response to all tunes. This is the expected result to indicate no identification.

Figure 10:
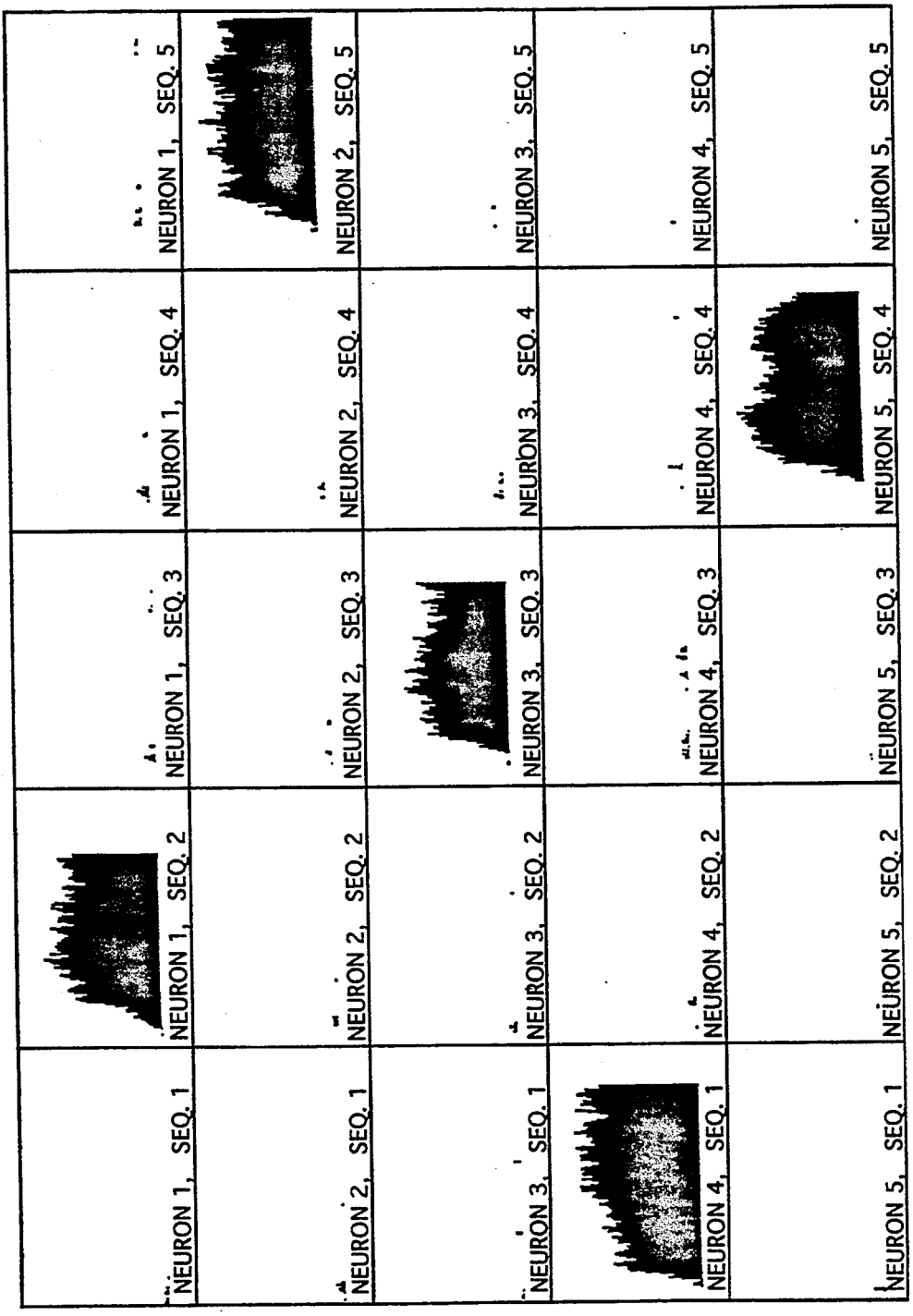
FIG. 10 shows the output of the system of the invention during the recognize mode in response to five musical sequences when each neuron had been subjected one of the tunes during a prior learn-mode step.
Figure 11:
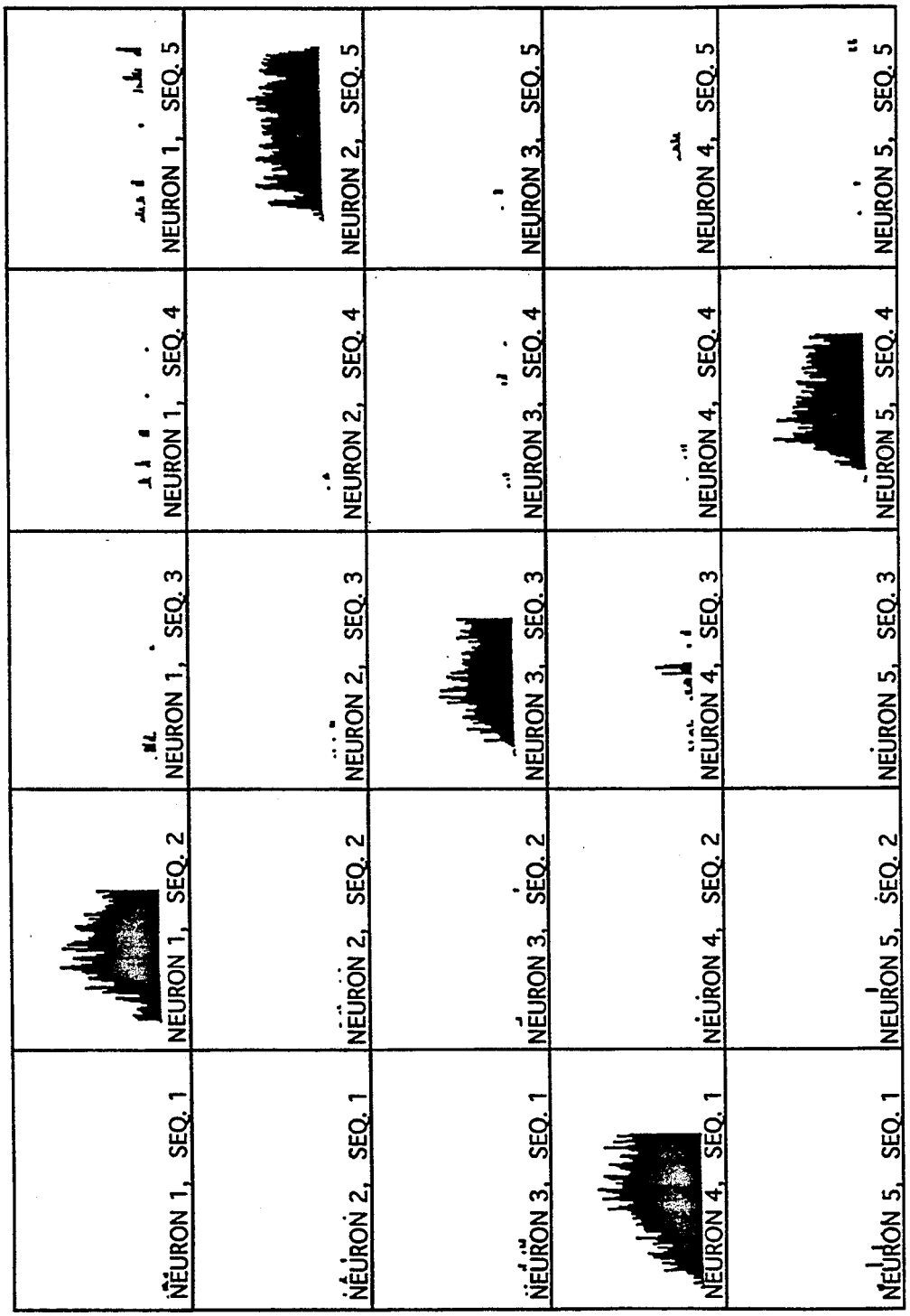
FIG. 11 illustrates the responses of the system when the learned tunes, which were played at 8 time steps per eighth note during the learn mode, were played at 4 time steps per eighth note during the recognize mode.
Figure 12:
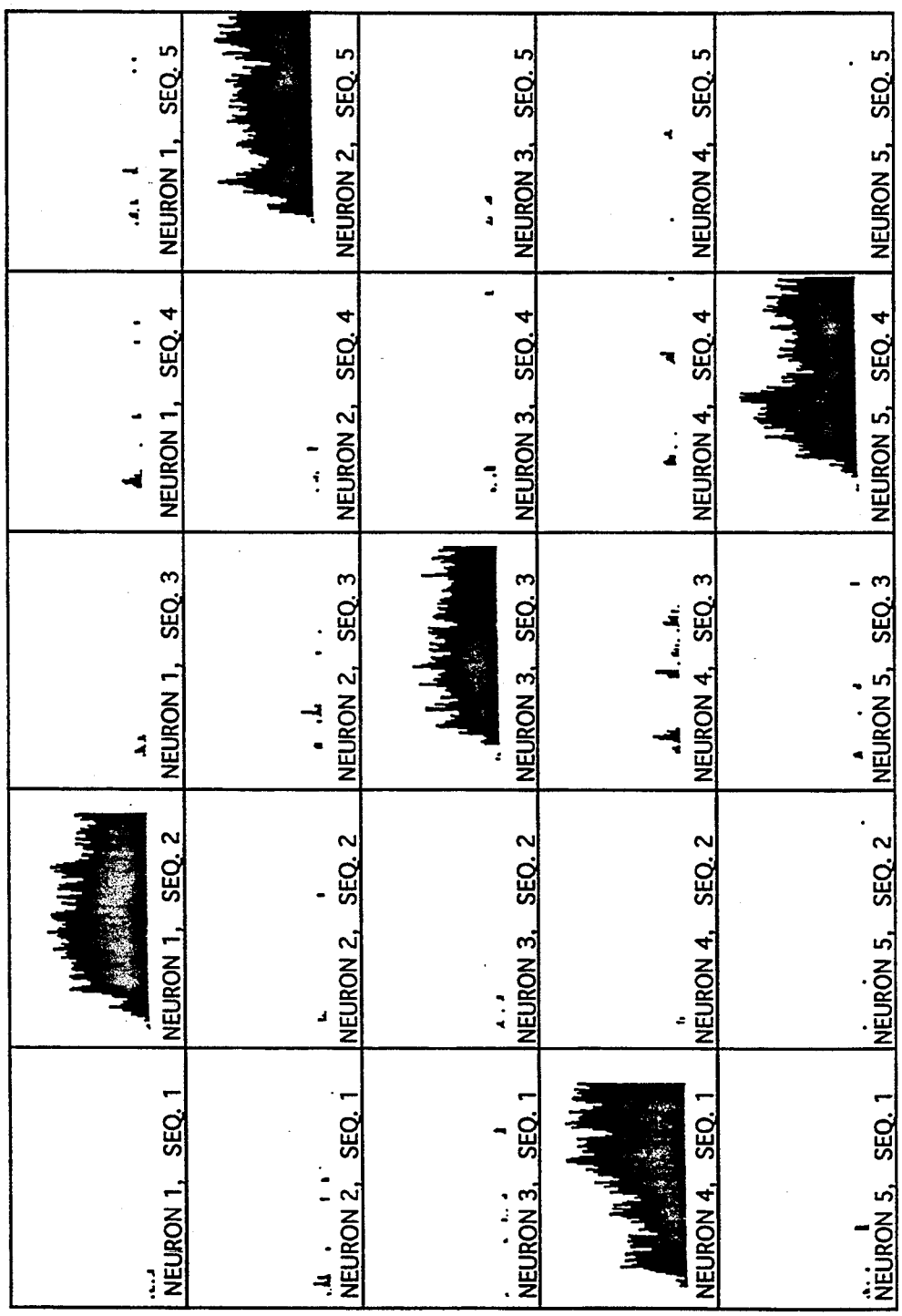
FIG. 12 illustrates the responses of the system when the learned tunes, which were played at 8 time steps per eighth note during the learn mode, were played at 6 time steps per eighth note during the recognize mode.
Figure 13:
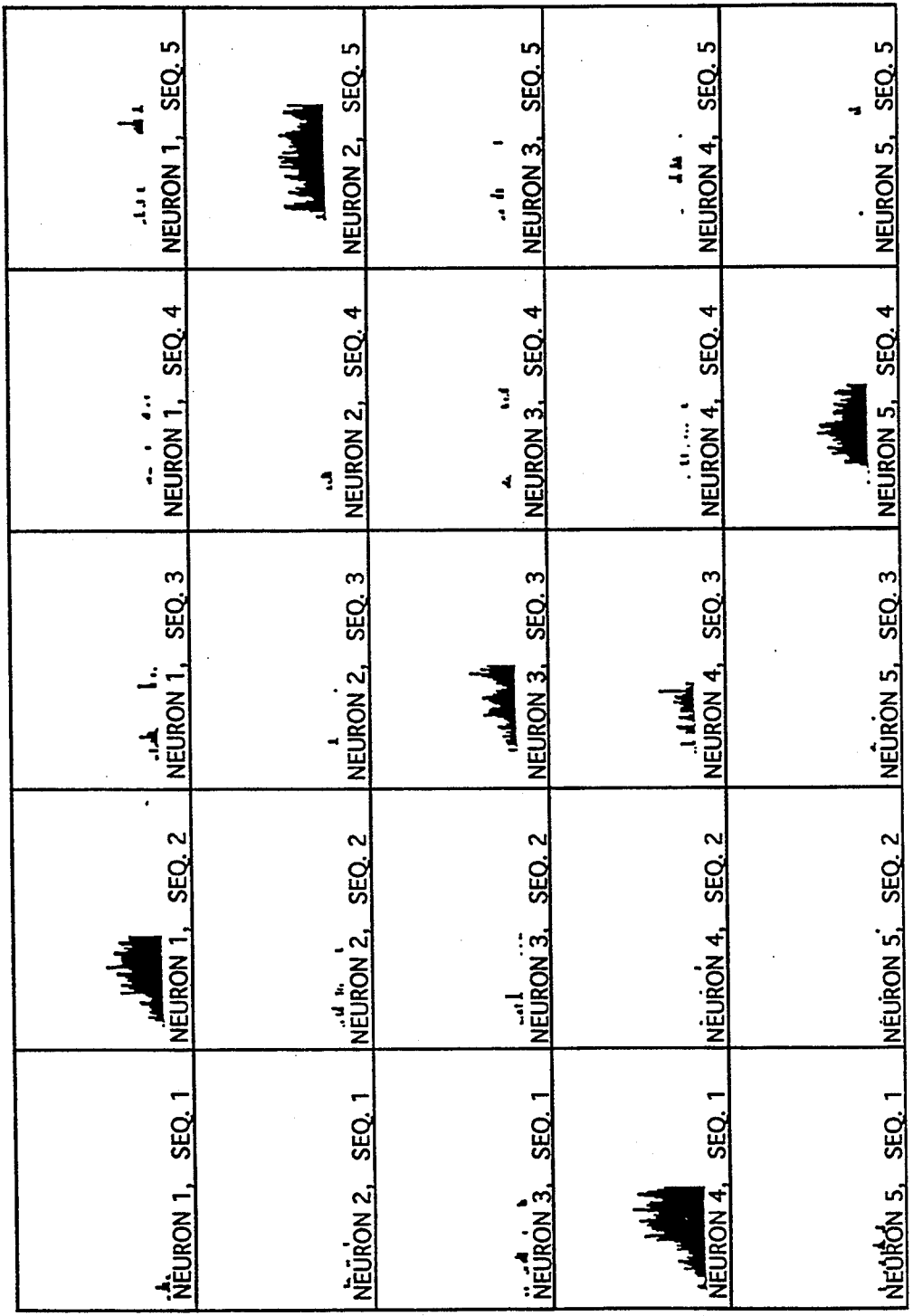
FIG. 13 illustrates the responses of the system when the learned tunes, which were played at 8 time steps per eighth note during the learn mode, were played at 10 time steps per eighth note during the recognize mode.
Figure 14:
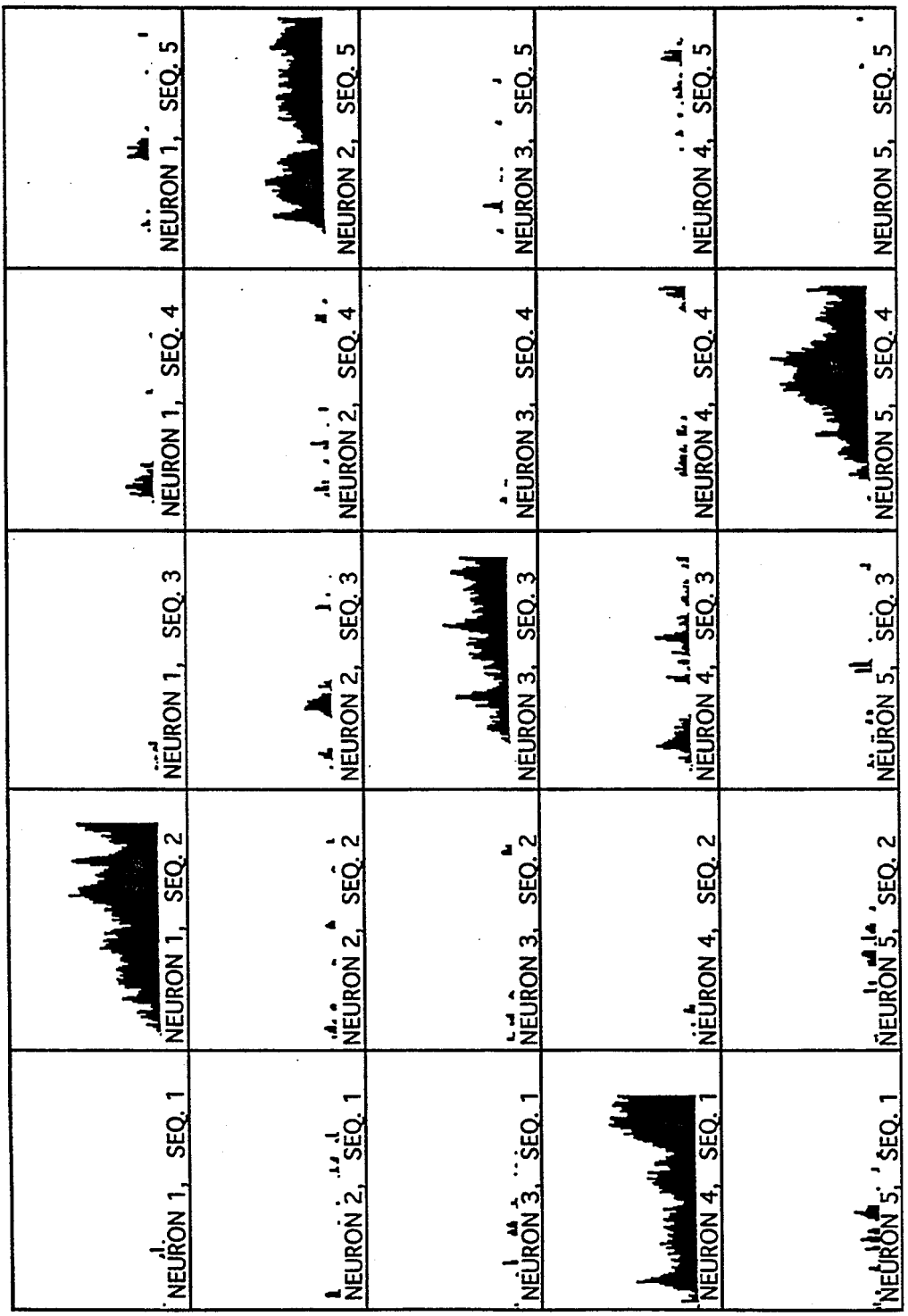
FIG. 14 illustrates the responses of the system when the learned tunes, which were played at 8 time steps per eighth note during the learn mode, were played at 16 time steps per eighth note during the recognize mode.

FIG. 10, on the other hand, shows the same outputs after each neuron has learned one musical sequence (sequences 2, 5, 4, 1, and 3 for neurons 1, 2, 3, 4, and 5, respectively). It is clear that each neuron produces a noticeable identification output when the particular tune that it has learned is being played. For example, neuron 1 shows a great response when sequence 2, which it had learned, is played and practically no response when any of the other sequences is played. The same is true for all neurons.

As a test of the system's tolerance to variances in scale, the tunes were also played at rates different form the rates at which they had been learned. FIGS. 11 through 14 illustrate the responses of the system when the learned tunes, which were played at 8 time steps per eighth note during the learn mode, were played at 4, 6, 10, and 16 time steps per eighth note, respectively, during the recognize mode. The system clearly identified the tunes even when they were played at rates half or double the learned rates.

It is believed that by learning ratios of frequencies, ratios of intensities, and ratios of durations, the method of this invention is also capable of recognizing temporal patterns played with different loudnesses than recorded during learning. Depending upon the appropriate processing of the sensory input, it can also easily recognize a learned sequence played in different musical keys or in different musical octaves. In learning spatial patterns, the ratios of duration can be substituted with ratios of distances (or lengths of lines or edges) to obtain similar results, permitting the identification of a spatial pattern independently of its size. Thus, in general, the described use of ratios has provided a basis for generalization in the recognition of all perceptual patterns.

It is understood that many equivalent systems are possible within the scope of the present invention, with different configurations of the neural system and different equation coefficients to optimize the response to a specific type of pattern. Those skilled in the art could easily design a system for a given type of pattern and for the hardware available to measure and process its characteristic parameters. Thus, various changes in the details, steps and materials that have been described may be made by those skilled in the art within the principles and scope of the invention herein illustrated and defined in the appended claims. While the present invention has been shown and described herein in what is believed to be the most practical and preferred embodiment, it is recognized that departures can be made therefrom within the scope of the invention, which is therefore not to be limited to the details disclosed herein, but is to be accorded the full scope of the claims so as to embrace any and all equivalent apparatus and methods.

APPENDIX A

```
c  relative.f   ---------------------------------------------  jla  4/6/91
c
c  Program to test the learning and recognition of sequences, extrapolated
c  from my interpretation of the possible bases and uses of the tuned
c  responses of neurons in the cerebral cortex.  For simplicity, one-
c  dimensional sequences (simple musical pieces for the recorder) are used
c  to test the theory.
c
c  If a sampling of the interim output from this program is to be written
c  to a file rather than displayed on the terminal, that can be achieved by
c  commenting out some lines of code and uncommenting other lines containing
c  "writes" and references to "syndat" or to the file "relative.datmon."
c
c  This FORTRAN 77 program has been run under the IRIX (an implementation of
c  UNIX) operating system on a Silicon Graphics Personal IRIS-4D workstation.
c  The graphics output for viewing the results of the simulations is generated
c  using HOOPS graphics software.  (IRIS-4D, IRIX, and Personal Iris are
c  trademarks of Silicon Graphics, Inc.  UNIX is a trademark of AT&T.  HOOPS
c  is a trademark of Ithaca Software.)
c
c  Copyright (c) 1991 by James L. Adams
c
c  Last modified on July 28, 1991.
c
c  To compile, use:   f77 -o relative relative.f -lhoops -lgl_s -lfm_s -lm -C
c               or:   f77 -o relative relative.f -lhoops -lgl -lm -C
c
#include <hf.h>

Program relative implicit   integer(I-K, M-N), logical(L), real(A-B, D-H, O-Z)
        implicit   character(C)

common /RVARS/ ma(55), inext, inextp c  Number of tunes (and number of neurons):
        PARAMETER (Ntunes = 5)
```

```
c   Number of synaptic pairs per level:
        PARAMETER (Npairs = 12)

c   Number of levels per neuron:
        PARAMETER (Nlevs = 112)

c   Number of columns in the axon delay line array:
        PARAMETER (Ncols = 128)

c   Number of time steps per integration period:
        PARAMETER (Ntspip = 8)

c   Number of phases in the simulation:
        PARAMETER (Nphzs = 7)

c Synapses:  2 synapses per pair, Npairs synaptic pairs per level,
c            Nlevs time levels per neuron, Ntunes neurons --
c  Synaptic "activation log ratios":  values which are fixed at the time
c      of learning:

dimension    synalr (Npairs, Nlevs, Ntunes)

c   Synaptic activation sums:  summations at each of the Nlevs levels
c      of each neuron:

dimension    sasums (Nlevs, Ntunes)

c   Peak neuron level activation after lateral inhibition:  maximum level
c      activation for up to Nlevs time steps of the Ntunes neurons for the
c      Ntunes sequences both before and after learning:

dimension    pnlaali (Nlevs, Ntunes, Ntunes, Nphzs)

c   Peak neural level activation at a single reporting interval for each
c      neuron:

dimension    pnlact (Ntunes)

c   Sensory input vector (current and previous):  copy current to previous
c      prior to each current input:

dimension    rinput (45)      ! current input activation.

c   Synaptic input-axon delay-line pointers:  delay-line array row and column
c              values for each of the synapses:

dimension    irptr (2, Npairs, Nlevs, Ntunes)
        dimension    icptr (2, Npairs, Nlevs, Ntunes)

c   Neuron numbers (dealt one per tune):

dimension    Nn (Ntunes)

c   Time steps per eighth-note duration:

dimension    ntsp8n (Nphzs)

cc  Data variables for test collection and output to relative.datmon:
c
c       dimension    syndat1 (Npairs)
c       dimension    syndat2 (Npairs)
c       dimension    syndat3 (Npairs)
c       dimension    syndat4 (Npairs)

c   Level of neuron (of the Nlevs); used during learning:

integer      neurlev
```

```
c    Integration period counter used in collecting pnlaali.

integer        ipctr c Input axon delay lines:  15 input frequencies (middle C through the E
c                above the next C) x 3 (tonic (1-15), last ON duration (16-30),
c                and last OFF duration (31-45) response neurons), Ncols time
c                steps maximum (at ntsp8n time steps per eighth-note, two
c                measures at 4/4 time); tonic responses are distributed as
c                a Gaussian activation across all frequencies at each instant
c                in time.

dimension      axondl (45, Ncols)

c Rests are signaled by a background level of activation of all 15
c                input frequencies.

c Input tune arrays:  maximum of 75 eighth notes per tune,
c                maximum of Ntunes tunes:

dimension      cN (75, Ntunes)  ! notes (middle C on up)
     dimension      nO (75, Ntunes)  ! octaves (1 = middle C to the
                                     !              next higher B)
     dimension      cO (75, Ntunes)  ! offsets codes:
                                     ! sharps('s'), flats('f'), naturals('n')

dimension      Nd8 (75, Ntunes) ! durations (in eighths)

dimension      itlgth (Ntunes)  ! lengths of tunes (in notes)

c Integer vectors for dealt numbers:

dimension      mv (150)
     dimension      nv (150)

c Character vector for page subtitles:

character*52   pstitle c Tune1:  "Eine Feste Burg ist Unser Gott," Johann Sebastian Bach data    (cN(i,1),i=1,15)
    1        /'c','c','c','g','a','b','c','b','a','g','c','b','a','g','a'/
     data    (nO(i,1),i=1,15)
    1        / 2,  2,  2,  1,  1,  1,  2,  1,  1,  1,  2,  1,  1,  1,  1 /
     data    (cO(i,1),i=1,15)
    1        /'n','n','n','n','n','n','n','n','n','n','n','n','n','n','n'/
     data    (Nd8(i,1),i=1,15)
    1        / 2,  2,  2,  1,  1,  2,  1,  1,  2,  2,  2,  2,  2,  2,  2 / data    (cN(i,1),i=16,30)
    1        /'f','e','d','c','c','g','a','g','f','g','c','g','g','a','b'/
     data    (nO(i,1),i=16,30)
    1        / 1,  1,  1,  1,  1,  1,  1,  1,  1,  1,  1,  1,  1,  1,  1 /
     data    (cO(i,1),i=16,30)
    1        /'n','n','n','n','n','n','n','n','s','n','n','n','n','n','n'/
     data    (Nd8(i,1),i=16,30)
    1        / 1,  1,  2,  2,  2,  2,  2,  2,  2,  6,  2,  2,  2,  2,  2 / data    (cN(i,1),i=31,45)
    1        /'c','b','c','b','a','a','g','a','a','g','a','f','e','c','b'/
     data    (nO(i,1),i=31,45)
    1        / 2,  1,  2,  1,  1,  1,  1,  1,  1,  1,  1,  1,  1,  2,  1 /
     data    (cO(i,1),i=31,45)
    1        /'n','n','n','n','n','n','n','n','n','n','n','n','n','n','n'/
     data    (Nd8(i,1),i=31,45)
    1        / 6,  2,  2,  2,  2,  2,  6,  2,  2,  2,  2,  2,  6,  2,  2 /
```

```
        data    (cN(i,1),i=46,60)
    1           /'a','g','a','f','e','d','c','r','r','r','r','r','r','r','r'/
        data    (nO(i,1),i=46,60)
    1           / 1,  1,  1,  1,  1,  1,  1,  0,  0,  0,  0,  0,  0,  0,  0 /
        data    (cO(i,1),i=46,60)
    1           /'n','n','n','n','n','n','n','n','n','n','n','n','n','n','n'/
        data    (Nd8(i,1),i=46,60)
    1           / 2,  2,  2,  1,  1,  2,  2,  1,  1,  1,  1,  1,  1,  1,  1 / data    (cN(i,1),i=61,75)
    1           /'r','r','r','r','r','r','r','r','r','r','r','r','r','r','r'/
        data    (nO(i,1),i=61,75)
    1           / 0,  0,  0,  0,  0,  0,  0,  0,  0,  0,  0,  0,  0,  0,  0 /
        data    (cO(i,1),i=61,75)
    1           /'n','n','n','n','n','n','n','n','n','n','n','n','n','n','n'/
        data    (Nd8(i,1),i=61,75)
    1           / 1,  1,  1,  1,  1,  1,  1,  1,  1,  1,  1,  1,  1,  1,  1 / c Tune2:  "Hatikva," Hebrew Anthem data    (cN(i,2),i=1,15)
    1           /'d','e','f','g','a','a','b','a','b','d','a','g','g','g','f'/
        data    (nO(i,2),i=1,15)
    1           / 1,  1,  1,  1,  1,  1,  1,  1,  2,  1,  1,  1,  1,  1,  1 /
        data    (cO(i,2),i=1,15)
    1           /'n','n','n','n','n','n','f','n','f','n','n','n','n','n','n'/
        data    (Nd8(i,2),i=1,15)
    1           / 1,  1,  1,  1,  2,  2,  1,  1,  1,  1,  4,  2,  1,  1,  2 / data    (cN(i,2),i=16,30)
    1           /'f','e','d','e','f','d','d','d','d','d','c','d','c','b','a'/
        data    (nO(i,2),i=16,30)
    1           / 1,  1,  1,  1,  1,  1,  1,  2,  2,  2,  2,  2,  2,  1,  1 /
        data    (cO(i,2),i=16,30)
    1           /'n','n','n','n','n','n','n','n','n','n','n','n','n','f','n'/
        data    (Nd8(i,2),i=16,30)
    1           / 2,  1,  1,  1,  1,  4,  2,  2,  2,  2,  1,  1,  1,  1,  4 / data    (cN(i,2),i=31,45)
    1           /'d','d','d','d','c','d','c','b','a','g','g','g','f','f','g'/
        data    (nO(i,2),i=31,45)
    1           / 1,  2,  2,  2,  2,  2,  2,  1,  1,  1,  1,  1,  1,  1,  1 /
        data    (cO(i,2),i=31,45)
    1           /'n','n','n','n','n','n','n','f','n','n','n','n','n','n','n'/
        data    (Nd8(i,2),i=31,45)
    1           / 2,  2,  2,  2,  1,  1,  1,  1,  4,  2,  1,  1,  2,  2,  1 / data    (cN(i,2),i=46,60)
    1           /'a','b','c','a','g','f','g','g','g','f','f','e','d','e','f'/
        data    (nO(i,2),i=46,60)
    1           / 1,  1,  2,  1,  1,  1,  1,  1,  1,  1,  1,  1,  1,  1,  1 /
        data    (cO(i,2),i=46,60)
    1           /'n','f','n','n','n','n','n','n','n','n','n','n','n','n','n'/
        data    (Nd8(i,2),i=46,60)
    1           / 1,  1,  1,  1,  1,  2,  2,  1,  1,  2,  2,  1,  1,  1,  1 / data    (cN(i,2),i=61,75)
    1           /'d','r','r','r','r','r','r','r','r','r','r','r','r','r','r'/
        data    (nO(i,2),i=61,75)
    1           / 1,  0,  0,  0,  0,  0,  0,  0,  0,  0,  0,  0,  0,  0,  0 /
        data    (cO(i,2),i=61,75)
    1           /'n','n','n','n','n','n','n','n','n','n','n','n','n','n','n'/
        data    (Nd8(i,2),i=61,75)
    1           / 4,  1,  1,  1,  1,  1,  1,  1,  1,  1,  1,  1,  1,  1,  1 / c Tune3:  "Mariner's Hornpipe"

data    (cN(i,3),i=1,15)
    1           /'c','b','a','g','f','e','d','e','c','c','g','e','f','g','a'/
        data    (nO(i,3),i=1,15)
    1           / 2,  1,  1,  1,  1,  1,  1,  1,  1,  1,  1,  1,  1,  1,  1 /
        data    (cO(i,3),i=1,15)
```

```
1         /'n','n','n','n','n','n','n','n','n','n','n','n','n','n','n'/
data      (Nd8(i,3),i=1,15)
1         / 2,  1,  1,  1,  1,  1,  1,  2,  2,  2,  2,  1,  1,  1,  1 / data      (cN(i,3),i=16,30)
1         /'b','c','d','c','b','g','g','b','c','c','c','c','a','g','f'/
data      (nO(i,3),i=16,30)
1         / 1,  2,  2,  2,  1,  1,  1,  1,  2,  1,  1,  2,  1,  1,  1 /
data      (cO(i,3),i=16,30)
1         /'n','n','n','n','n','n','n','n','n','n','n','n','n','n','n'/
data      (Nd8(i,3),i=16,30)
1         / 1,  1,  1,  1,  2,  2,  2,  2,  2,  2,  2,  2,  1,  1,  1 / data      (cN(i,3),i=31,45)
1         /'g','a','a','d','d','d','d','b','a','g','a','b','g','a','b'/
data      (nO(i,3),i=31,45)
1         / 1,  1,  1,  2,  1,  1,  2,  1,  1,  1,  1,  1,  1,  1,  1 /
data      (cO(i,3),i=31,45)
1         /'n','n','n','n','n','n','n','n','n','n','n','n','n','n','n'/
data      (Nd8(i,3),i=31,45)
1         / 1,  2,  2,  2,  2,  2,  2,  1,  1,  1,  1,  1,  1,  1,  1 / data      (cN(i,3),i=46,60)
1         /'c','d','c','d','c','b','a','g','a','b','a','b','a','g','f'/
data      (nO(i,3),i=46,60)
1         / 2,  2,  2,  2,  2,  1,  1,  1,  1,  1,  1,  1,  1,  1,  1 /
data      (cO(i,3),i=46,60)
1         /'n','n','n','n','n','n','n','n','n','n','n','n','n','n','n'/
data      (Nd8(i,3),i=46,60)
1         / 1,  1,  1,  1,  1,  1,  1,  1,  1,  1,  1,  1,  1,  1,  1 / data      (cN(i,3),i=61,75)
1         /'e','f','e','d','e','f','g','a','b','c','c','c','r','r','r'/
data      (nO(i,3),i=61,75)
1         / 1,  1,  1,  1,  1,  1,  1,  1,  2,  1,  1,  1,  1,  1,  1 /
data      (cO(i,3),i=61,75)
1         /'n','n','n','n','n','n','n','n','n','n','n','n','n','n','n'/
data      (Nd8(i,3),i=61,75)
1         / 1,  1,  1,  1,  1,  1,  1,  1,  2,  2,  2,  2,  1,  1 / c Tune4:   "Never Weather-Beaten Sail," Thomas Campion data      (cN(i,4),i=1,15)
1         /'a','a','g','c','b','b','a','d','c','f','g','g','f','c','g'/
data      (nO(i,4),i=1,15)
1         / 1,  1,  1,  2,  1,  1,  1,  2,  2,  1,  1,  1,  1,  2,  1 /
data      (cO(i,4),i=1,15)
1         /'n','n','n','n','f','n','n','n','n','n','n','n','n','n','n'/
data      (Nd8(i,4),i=1,15)
1         / 2,  2,  3,  1,  2,  2,  3,  1,  2,  2,  2,  2,  8,  2,  1 / data      (cN(i,4),i=16,30)
1         /'a','b','f','g','a','e','f','g','g','a','g','a','b','c','d'/
data      (nO(i,4),i=16,30)
1         / 1,  1,  1,  1,  1,  1,  1,  1,  1,  1,  1,  1,  1,  2,  2 /
data      (cO(i,4),i=16,30)
1         /'n','f','n','n','n','n','n','n','n','n','n','n','f','n','n'/
data      (Nd8(i,4),i=16,30)
1         / 1,  2,  1,  1,  2,  1,  1,  3,  1,  1,  1,  1,  1,  3,  1 / data      (cN(i,4),i=31,45)
1         /'c','b','a','b','g','d','d','e','c','f','f','g','e','a','a'/
data      (nO(i,4),i=31,45)
1         / 2,  1,  1,  1,  1,  1,  1,  1,  1,  1,  1,  1,  1,  1,  1 /
data      (cO(i,4),i=31,45)
1         /'n','f','n','n','n','n','n','n','n','n','n','n','n','n','n'/
data      (Nd8(i,4),i=31,45)
1         / 1,  1,  1,  1,  4,  3,  1,  2,  2,  3,  1,  2,  2,  3,  1 / data      (cN(i,4),i=46,60)
1         /'b','g','c','b','a','g','f','d','e','f','g','a','b','g','f'/
data      (nO(i,4),i=46,60)
1         / 1,  1,  2,  1,  1,  1,  1,  1,  1,  1,  1,  1,  1,  1,  1 /
```

```
      data    (cO(i,4),i=46,60)
     1        /'f','n','n','f','n','n','n','n','n','n','n','n','f','n','n'/
      data    (Nd8(i,4),i=46,60)
     1        / 2,  2,  1,  1,  1,  1,  2,  1,  1,  1,  1,  1,  1,  3,  1 / data    (cN(i,4),i=61,75)
     1        /'e','r','r','r','r','r','r','r','r','r','r','r','r','r','r'/
      data    (nO(i,4),i=61,75)
     1        / 1,  1,  1,  1,  1,  1,  1,  1,  1,  1,  1,  1,  1,  1,  1 /
      data    (cO(i,4),i=61,75)
     1        /'n','n','n','n','n','n','n','n','n','n','n','n','n','n','n'/
      data    (Nd8(i,4),i=61,75)

c Tune5:   "Melody from Sonata in F Major," George Frederic Handel data    (cN(i,5),i=1,15)
     1        /'c','d','c','c','r','a','g','f','e','f','g','e','d','c','r'/
      data    (nO(i,5),i=1,15)
     1        / 1,  1,  1,  1,  1,  1,  1,  1,  1,  1,  1,  1,  1,  1,  1 /
      data    (cO(i,5),i=1,15)
     1        /'n','n','n','n','n','n','n','n','n','n','n','n','n','n','n'/
      data    (Nd8(i,5),i=1,15)
     1        / 6,  1,  1,  4,  2,  2,  2,  1,  1,  2,  2,  1,  1,  2,  2 / data    (cN(i,5),i=16,30)
     1        /'c','a','g','r','c','a','g','r','f','d','c','f','b','b','a'/
      data    (nO(i,5),i=16,30)
     1        / 2,  1,  1,  1,  2,  1,  1,  1,  1,  1,  1,  1,  1,  1,  1 /
      data    (cO(i,5),i=16,30)
     1        /'n','n','n','n','n','n','n','n','n','n','n','n','f','f','n'/
      data    (Nd8(i,5),i=16,30)
     1        / 2,  2,  2,  2,  2,  2,  2,  2,  2,  2,  2,  2,  2,  2,  2 / data    (cN(i,5),i=31,45)
     1        /'d','e','g','c','f','b','a','a','r','a','d','g','a','c','f'/
      data    (nO(i,5),i=31,45)
     1        / 1,  1,  1,  1,  1,  1,  1,  1,  1,  1,  2,  1,  1,  2,  1 /
      data    (cO(i,5),i=31,45)
     1        /'n','n','n','n','n','f','n','n','n','n','n','n','n','n','n'/
      data    (Nd8(i,5),i=31,45)
     1        / 2,  1,  1,  3,  1,  3,  1,  4,  2,  1,  1,  2,  1,  1,  2 / data    (cN(i,5),i=46,60)
     1        /'d','f','f','e','r','g','b','a','g','r','g','f','g','a','g'/
      data    (nO(i,5),i=46,60)
     1        / 2,  1,  1,  1,  1,  1,  1,  1,  1,  1,  1,  1,  1,  1,  1 /
      data    (cO(i,5),i=46,60)
     1        /'n','n','n','n','n','n','f','n','n','n','n','n','n','n','n'/
      data    (Nd8(i,5),i=46,60)
     1        / 1,  1,  2,  2,  2,  1,  1,  2,  2,  1,  1,  1,  1,  3,  1 / data    (cN(i,5),i=61,75)
     1        /'g','f','f','r','r','r','r','r','r','r','r','r','r','r','r'/
      data    (nO(i,5),i=61,75)
     1        / 1,  1,  1,  1,  1,  1,  1,  1,  1,  1,  1,  1,  1,  1,  1 /
      data    (cO(i,5),i=61,75)
     1        /'n','n','n','n','n','n','n','n','n','n','n','n','n','n','n'/
      data    (Nd8(i,5),i=61,75)
     1        / 3,  1,  8,  1,  1,  1,  1,  1,  1,  1,  1,  1,  1,  1,  1 / data    (ntsp8n(i),i=1,Nphzs) / 8, 8, 8, 6, 10, 4, 16 / data    itlgth /52, 61, 73, 61, 63/    ! lengths of tunes
cc------------------------
cc  Open the output file.
cc------------------------
c
c30       Open (unit=1, file='relative.datmon',
c      1       status='old', err=35)
c         goto 40
c
c35       Print *,'Cannot open file relative.datmon '
```

```
c        goto 300
c
c
c40      Continue c Coeficients controlling magnitude and spread of axon delay line input
c    activation:

acoef = 10000.0 ! Arbitrary value large with respect to 1.0.
         bcoef =    0.1 c Coeficients controlling synaptic pair activation:

fcoef = 10000.0 ! Arbitrary value large with respect to 1.0.
         gcoef =    8.0    ! The larger this number the more exactly the
                           !    input must match the learned input to yield
                           !    a strong response.

c Axon delay line pointer:  shift pointer at each time step rather than
c                rewriting array; use modulo arithmetic as appropriate:

iaxptr = Ncols   ! Pointer to input position in axon delay lines.

idum = -1
         tmp = RAN3(idum)          ! Initialize random number sequence.

c***********************************************************************
c
c             Random Neuron Assignments for Learning Tunes
c
c*********************************************************************** call DEAL (Nn, Ntunes, 1, Ntunes, idum) ! Get Ntunes numbers
                                                 ! in range 1, Ntunes.

c***********************************************************************
c
c             Random Synaptic Pair Assignment
c
c    Each level of each output neuron is arbitrarily set up with Npairs
c    synaptic pairs -- four tonic inputs, four last ON duration inputs,
c    and four last OFF duration inputs.  The following code assigns
c    pointers from each synapse to a row (irptr) and to a column (icptr)
c    of the input axon delay line (axondl).  The column pointers are
c    randomly assigned values between 0 and Ncols-1 (there are Ncols
c    columns total in the axon delay line array).
c
c***********************************************************************
         do ii = 1, Ntunes    ! Neuron loop.
           do k = 1, Nlevs    ! Time level loop.
             call DEAL(nv,8,1,15,idum) ! Get 8 numbers in range of 1, 15.
             call DEAL(mv,8,0,Ncols-1,idum) ! Get 8 nums in range of 0,Ncols-1.
             do j = 1, 4              ! Pair per level loops (tonic)
               do i = 1, 2            ! Synaptic pair loop.
                 irptr(i,j,k,ii) = nv(i + 2*(j-1))  ! Row pointers
                 icptr(i,j,k,ii) = mv(i + 2*(j-1))  ! Column pointers
               end do
             end do
             call DEAL(nv,8,16,30,idum) ! Get 8 numbers in range of 16, 30.
             call DEAL(mv,8,0,Ncols-1,idum) ! Get 8 nums in range of 0,Ncols-1.
             do j = 5, 8              ! Pair per level loops (last ON dur.)
               do i = 1, 2            ! Synaptic pair loop.
                 irptr(i,j,k,ii) = nv(i + 2*(j-5))  ! Row pointers
                 icptr(i,j,k,ii) = mv(i + 2*(j-5))  ! Column pointers
               end do
             end do
             call DEAL(nv,8,31,45,idum) ! Get 8 numbers in range of 31, 45.
             call DEAL(mv,8,0,Ncols-1,idum) ! Get 8 nums in range of 0,Ncols-1.
```

```
            do j = 9, 12                    ! Pair per level loops (last OFF dur.)
               do i = 1, 2                  ! Synaptic pair loop.
                  irptr(i,j,k,ii) = nv(i + 2*(j-9))   ! Row pointers
                  icptr(i,j,k,ii) = mv(i + 2*(j-9))   ! Column pointers
               end do
            end do
         end do
      end do
```

```
C***********************************************************************
c
c              Initialize Synaptic Pair Activation Log Ratios
c
c     Before learning, they are assumed equal (with log values of 0.5).
c
C*********************************************************************** do k = 1, Ntunes    ! Neuron loop
            do j = 1, Nlevs     ! Time level per neuron loop
               do i = 1, Npairs    ! Synaptic pairs per time level loop
                  synalr (i, j, k) = 0.5
               end do
            end do
         end do
```

```
C***********************************************************************
c
c                         Main Process Loop
c
c     The simulation presents three or more phases:  (1) playing and
c     graphically displaying the input tunes prior to any learning,
c     (2) learning the tunes without displaying, (3) playing the tunes
c     after they have been learned and displaying the responses of all
c     of the simulated neurons to each tune.  Additional phases use
c.    different playback speeds to see if the sequences are still
c     recognized.
c
c
c                         Delay Line Management
c
c     At each time step, the input pointer is moved back one and a new
c     column of input is generated and inserted.  It begins at Ncols and
c     and is decremented by 1 each time step.  After it reaches 1 it is
c     set to Ncols again on the next time step (a circular reuse of
c     the delay-line array).  References to columns in the delay-line array
c     must add in this pointer value and then use modulo-Ncols of the result.
c     (A value of zero is set to Ncols.)  The synaptic delay-line pointer
c     offsets vary from 0 to Ncols-1.
c
C*********************************************************************** c.......
         do 504 iphz = 1, Nphzs            ! The phases described above.

print *,' '
            print *,' '
            print *,'Phase:',iphz
            print *,' '
            print *,'Time steps per 8th note:', ntsp8n(iphz)

c           write (1,"(a)") ' '
c           write (1,"(a)")
c       1 '   Writing all synaptic activations during time level 20'
c           write (1,"(a)")
c       1 'in the order of log synapse 1 activation, log synapse 2 activation,'
c           write (1,"(a)")
c       1 'difference of log differences, and resulting Gaussian value.'
c           write (1,"(a)") ' '
c           write (1,"(a6,i4)") 'Phase:',iphz
c           write (1,"(a)") ' '
c           write (1,"(a24,i4)") 'Time steps per 8th note:', ntsp8n(iphz)
```

```
c..........
              do 503 itune = 1, Ntunes       ! Number of tunes/neurons.

print *,' '
c             write (1,"(a)") ' ' neurlev = 1 ! Initialize neuron level (used in learning).

ipctr = 0 ! Initialize integration period counter.

c  The following zeroing of sasums is done prior to the beginning of each
c     tune, but these values are reset during the playing of the tunes to
c     achieve a sequential spatial/temporal summation:

do n = 1, Ntunes   ! Neuron loop
                 do m = 1, Nlevs        ! Time level loop
                    sasums(m,n) = 0.0    ! Level activation.
                 end do
              end do c  Fill the axon delay line array with random activity:

call DEAL(mv,Ncols,1,Ncols,idum)  ! Get Ncols nums, range 1,Ncols.
              do j = 1, Ncols
                 m = mv(j)
                 k = m * 100
                 call DEAL(nv,45,k,(k+99),idum) ! Get 45 nums, range k,k+99.
                 do i = 1, 45
                    axondl (i, j) = FLOAT (nv(i))
                 end do
              end do c  Initialize the rinput vector to ones (zeros not used because of loss
c     of info in log operation):

do i = 1, 45
                 rinput(i) = 1.0
              end do c.............
              do 502 inote = 1, itlgth(itune)  ! Up to 75 notes in a tune.

c  Get row of axon delay array:

c  Basic notes:
              if (cN(inote,itune).eq.'r') then
                 inrow = 0
              else
                 if (cN(inote,itune).eq.'c') then
                    inrow = 1
                 else if (cN(inote,itune).eq.'d') then
                    inrow = 3
                 else if (cN(inote,itune).eq.'e') then
                    inrow = 5
                 else if (cN(inote,itune).eq.'f') then
                    inrow = 6
                 else if (cN(inote,itune).eq.'g') then
                    inrow = 8
                 else if (cN(inote,itune).eq.'a') then
                    inrow = 10
                 else if (cN(inote,itune).eq.'b') then
                    inrow = 12
                 else
                    inrow = 2         ! Just for insurance.
                 end if
c  Flats or sharps:
                 if (cO(inote,itune).eq.'f') then
                    inrow = inrow - 1
                 else if (cO(inote,itune).eq.'s') then
                    inrow = inrow + 1
                 end if
```

```
c   Octave:
            if (nO(inote,itune).eq.2) inrow = inrow + 12
         end if
         inrow = 1 + MOD (inrow-1, 15)    ! Precaution against notes
                                          !   outside supported range.

c   Input activation (tonic)
         if (inrow.eq.0) then
            do i = 1, 15
               rinput(i) = 0.0
               axondl(i,iaxptr) = rinput(i)
            end do
         else
            do i = 1, 15
               tmp = FLOAT (inrow - i)
               rinput(i) = acoef * EXP (-bcoef*tmp*tmp)
               axondl(i,iaxptr) = rinput(i)
            end do
         end if c   Last ON duration (this code is executed at the beginning of a duration):
         if (inrow.ne.0) then
            j = inrow + 15 rinput(j) = FLOAT (Nd8(inote, itune))

axondl(j,iaxptr) = rinput(j)

end if c   Last OFF duration (this code is executed at the beginning of a duration):
         do i = 1, 15
            j = i + 30 if (inrow.ne.i) then
               rinput(j) = rinput(j) + FLOAT (Nd8(inote, itune))
            else
               rinput(j) = 1.0
            end if axondl(j,iaxptr) = rinput(j)

end do c...............
         do 501 i8th = 1, Nd8(inote, itune)

c...................
         do 500 i8dura = 1, ntsp8n(iphz) ! Loop on time steps per
                                         !  8th note.

c            Synaptic activations:
         do n = 1, Ntunes   ! Neuron loop
            do m = 1, Nlevs    ! Time level loop
               do k = 1, Npairs   ! Synaptic pair per level loop itmp = icptr(1,k,m,n) + iaxptr
                                        ! Column pointer, syn 1.
                  if (itmp.gt.Ncols) itmp = itmp - Ncols
                  tmp = AMAX1 (1.0, axondl(irptr(1,k,m,n),itmp))
                  tmp1 = ALOG (tmp)

itmp = icptr(2,k,m,n) + iaxptr
                                        ! Column pointer, syn 2.
```

```
              if (itmp.gt.Ncols) itmp = itmp - Ncols
              tmp = AMAX1 (1.0, axondl(irptr(2,k,m,n),itmp))
              tmp2 = ALOG (tmp)

tmp3 = synalr(k,m,n) - (tmp1 - tmp2)
              tmp  = fcoef * EXP (-gcoef*tmp3*tmp3)
              sasums(m,n) = sasums(m,n) + 0.5 * tmp
c   The above 1/2 factor reflects spatiotemporal summation with 1/2 of the
c     activation at the prior level at the previous time step.

c   Apply learning only once per processing level:
                                 if ((n.eq.Nn(itune)).and.(m.eq.neurlev).and.
      1                             (i8dura.eq.1).and.(iphz.eq.2)) then
c                                Apply learning to the current synaptic pair:
                                    synalr(k,m,n) = tmp1 - tmp2 c             if ((inote.eq.20).and.(k.eq.1)) then
c                 write (1,"(a)") 'Learning activated.'
c                 write (1,11) n, Nn(itune), neurlev, m, i8dura, iphz, k
c             end if
c11   FORMAT ('n',i3,'; Nn(itune)',i3,'; neurlev',i3,'; m',i3,
c      1      '; i8dura',i3,'; iphz',i3,'; k',i3)

end if cc  Collect information for testing:
c
c             if ((inote.eq.20).and.(m.eq.neurlev)) then
c                 syndat1(k) = tmp1
c                 syndat2(k) = tmp2
c                 syndat3(k) = tmp3
c                 syndat4(k) = tmp
c             end if end do ! End of synaptic pair loop (k-variable).

cc  Write test results to file:
c
c             if ((inote.eq.20).and.(m.eq.neurlev)) then
c                 write (1,21) iphz, itune, inote, i8th, neurlev, i8dura, n
c                 write (1,"(12F7.3)") syndat1
c                 write (1,"(12F7.3)") syndat2
c                 write (1,"(12F7.3)") syndat3
c                 write (1,"(12F7.0)") syndat4
c                 write (1,"(a)") ' '
c             end if
                      end do  ! End of the time level loop (m-variable).
                   end do  ! End of the neuron loop (n-variable).

c21   FORMAT ('Phase',i2,'; tune',i3,'; note',i3,'; 8th',i3,
c      1      '; neurlev',i3,'; i8dura',i3,'; neuron',i3)

c  Update the axon delay line input pointer:

iaxptr = iaxptr - 1
               if (iaxptr.lt.1) iaxptr = Ncols c  At the END of the i8dura loop, continue the tonic input and
c  apply the decay of the phasic inputs:

c    Tonic:
                 do i = 1, 15
                    axondl(i,iaxptr) = rinput(i)
                 end do c    Last ON and OFF durations:

do i = 16, 45
                    axondl(i,iaxptr) = rinput(i)
                 end do
```

```
                    ipctr = ipctr + 1
                if (ipctr.ge.Ntspip) then ! Accumulate for Ntspip time steps
                                          !   (assumed to be 1/8 of an 8th note
                                          !      per time step).
                    ipctr = 0 c   Find the maximum level activation in each neuron for this 8th note interval:

do n = 1, Ntunes
                       tmp = 0.0
                       do m = 1, Nlevs
                          tmp = AMAX1 (tmp, sasums(m,n))
                       end do
                       pnlact(n) = tmp
                    end do c   Subtract the average neural activity in all neurons from that of each
c      neuron for this 8th note interval:

tmp = 0.0
                    do n = 1, Ntunes
                       tmp = tmp + pnlact(n)
                    end do tmp1 = tmp / Ntunes
                    do n = 1, Ntunes
                       pnlaali(neurlev, n, itune, iphz) =
     1                             AMAX1 (0.0, (pnlact(n) - tmp1))
                    end do c       Support spatiotemporal summation (leaving sasums(1,n) unchanged):

do n = 1, Ntunes
                       do m = Nlevs, 2, -1
                          sasums(m,n) = 0.5 * sasums(m-1,n)
                       end do
                       sasums(1,n) = 0.5 * sasums(1,n)
                    end do c       Print the neural activations for this 8th note interval:

c                   if (iphz.ne.2) write (1,31) iphz,itune,inote,i8th,
                    if (iphz.ne.2) write (*,31) iphz,itune,inote,i8th,
     1                  (pnlaali(neurlev,i,itune,iphz),i=1,Ntunes)

c31                 FORMAT ('Phase',i2,'; tune',i2,'; note',i3,'; 8th',i3,
c    1                      '; NeurAct',10f10.0)
31                  FORMAT ('Ph',i2,'; tu',i2,'; no',i3,'; 8th',i2,
     1                      '; Act',10f9.0)

neurlev = neurlev + 1  ! Increment neuron level.

if (neurlev.gt.Nlevs) goto 503  ! Only set up to support a
                                          !       maximum of Nlevs levels per tune.

end if

500             Continue
c.................
501             Continue
c................
502             Continue
c..............
```

```
503          Continue
c..........
504          Continue
c.......

cc  Wrap up test without displaying output:
c
c        Close (1)
c        goto 300 c  Find the maximum neural activation:
         actmax = 0.0 do m = 1, Nphzs       ! Up to Nphzs trials tracked.
            do k = 1, Ntunes   ! Ntunes tunes.
               do j = 1, Ntunes ! Ntunes neurons.
                  do i = 1, Nlevs ! Up to Nlevs 8th notes per tune.
                     actmax = AMAX1 (actmax, pnlaali(i,j,k,m))
                  end do
               end do
            end do
         end do actsf = 1.4 / actmax    ! Scale factor for histograms.

c****************************************************************
c
c                     Graphics Section
c
c     Use a full screen in landscape orientation to display the results
c     of learning or recognizing all tunes under a given set of conditions.
c     Plot matrices of neuron response histograms vs. sequence numbers.
c
c**************************************************************** c        data    (ntsp8n(i),i=1, Nphzs) / 8,  8,  8,  6, 10,  4, 16 /
c  page number:                          1    2    3    4    5    6 c  First page:

c                '         1         2         3         4         5  '
c                '12345678901234567890123456789012345678901234567890 12'
         pstitle = '   Before Learning  -  8 Time Steps per 8th Note    ' ntri = 1 call PAGE (pnlaali, ntsp8n, actsf, ntri, Ntunes, pstitle, Nlevs, Nphzs)

call HF_CLEAR_DISPLAY        ! Prepare for another picture.

c  Second page:

c                '12345678901234567890123456789012345678901234567890 12'
         pstitle = ' Learned at 8 Time Steps per 8th Note; Played at 8  '
         pstitle = '    After Learning  -  8 Time Steps per 8th Note    ' ntri = 3 call PAGE (pnlaali, ntsp8n, actsf, ntri, Ntunes, pstitle, Nlevs, Nphzs)

call HF_CLEAR_DISPLAY        ! Prepare for another picture.

c  Third page:

c                '12345678901234567890123456789012345678901234567890 12'
         pstitle = ' Learned at 8 Time Steps per 8th Note; Played at 6  '
```

```
              ntri = 4 call PAGE (pnlaali, ntsp8n, actsf, ntri, Ntunes, pstitle, Nlevs, Nphzs)

call HF_CLEAR_DISPLAY        ! Prepare for another picture.

c     Fourth page:
c                    '123456789012345678901234567890123456789012345678901234567890'
              pstitle = ' Learned at 8 Time Steps per 8th Note; Played at 10 ' ntri = 5 call PAGE (pnlaali, ntsp8n, actsf, ntri, Ntunes, pstitle, Nlevs, Nphzs)

call HF_CLEAR_DISPLAY        ! Prepare for another picture.

c     Fifth page:
c                    '123456789012345678901234567890123456789012345678901234567890'
              pstitle = ' Learned at 8 Time Steps per 8th Note; Played at 4  ' ntri = 6 call PAGE (pnlaali, ntsp8n, actsf, ntri, Ntunes, pstitle, Nlevs, Nphzs)

call HF_CLEAR_DISPLAY        ! Prepare for another picture.

c     Sixth page:
c                    '123456789012345678901234567890123456789012345678901234567890'
              pstitle = ' Learned at 8 Time Steps per 8th Note; Played at 16 ' ntri = 7 call PAGE (pnlaali, ntsp8n, actsf, ntri, Ntunes, pstitle, Nlevs, Nphzs)

call HF_CLEAR_DISPLAY        ! Prepare for another picture.

300           Continue
              END c   page.subr ------------------------------------------------ jla 6/15/91
c
c   Creates the graphics output from the sequence learning simulations.
c
              Subroutine PAGE (pnlaali, ntsp8n, actsf, ntri, Ntunes, pstitle,
             1                                    Nlevs, Nphzs)

real          pnlaali (Nlevs, Ntunes, Ntunes, Nphzs)
              integer       ntsp8n (Nphzs)
              character*52  pstitle
              character*34  optitle c                      "          1         2         3
c                      "1234567890123456789012345678901234"
              optitle = "?driver/postscript/'relative.out_'"   ! Init output title.
              itmp = 1
              if (ntri.gt.1) itmp = ntri - 1
              write (optitle(33:33),"(I1)") itmp call HF_OPEN_SEGMENT ('?Picture')
```

```
        call HF_SET_WINDOW (-1.0, 1.0, -1.0, 1.0)
        call HF_SET_WINDOW_FRAME ('On')
        call HF_SET_COLOR ('windows = white')
        call HF_SET_LINE_WEIGHT (4.0)

call HF_OPEN_SEGMENT ('title')

call HF_SET_WINDOW (-1.0, 1.0, 0.8, 1.0)
           call HF_SET_COLOR ('text = navy blue')
           call HF_SET_TEXT_SIZE (0.6)
           call HF_INSERT_TEXT (0.0, 0.33, 0.0,
     1         'Simulated Learning of Temporal')
           call HF_INSERT_TEXT (0.0, -0.33, 0.0,
     1         'and/or Spatial Patterns')

call HF_CLOSE_SEGMENT ()        ! Close 'title' call HF_OPEN_SEGMENT ('trial')

call HF_SET_WINDOW (-1.0, 1.0, -1.0, 0.8)
           call HF_SET_COLOR ('text = navy blue')
           call HF_SET_TEXT_SIZE (0.4)

if (ntri.ge.3) then
              itmp = ntsp8n(ntri)
              if (itmp.lt.10) then
                 write (pstitle(50:50),"(I1)") itmp
              else
                 write (pstitle(50:51),"(I2)") itmp
              end if
           end if call HF_INSERT_TEXT (0.0, -0.95, 0.0, pstitle)

call SUBWINS (pnlaali, actsf, ntri, Ntunes, Nlevs, Nphzs)

call HF_CLOSE_SEGMENT ()        ! Close 'trial' call HF_CLOSE_SEGMENT ()          ! CLOSE '?Picture'
      call HF_OPEN_SEGMENT (optitle)

call HF_SET_DRIVER_OPTIONS
     1      ("force black-and-white,landscape orientation")

call HF_INCLUDE_SEGMENT ("?Picture")
c       call HF_INCLUDE_SEGMENT ("?Picture/title")
c       call HF_INCLUDE_SEGMENT ("?Picture/trial")
        call HF_SET_WINDOW_FRAME ("off")
        call HF_UPDATE_DISPLAY ()

call HF_CLOSE_SEGMENT ()          ! Close output segment.

call HF_DELETE_SEGMENT (optitle)

call HF_PAUSE ()

END c subwins.subr ------------------------------------------ jla 6/15/91
c
c Creates the graphics output for the subwindows.
c
      Subroutine SUBWINS (pnlaali, actsf, ntri, Ntunes, Nlevs, Nphzs)

real            pnlaali (Nlevs, Ntunes, Ntunes, Nphzs)
        character*20    ctext
        character*4     cseg c                '12345678901234567890'
        ctext = 'Neuron _, Sequence _'
```

```
        cseg = 'n_s_'              ! Initialize segment name.

wwinc = 2.0 / FLOAT (Ntunes)   ! Window width increment.
        whinc = 1.8 / FLOAT (Ntunes)   ! Window height increment.

do neur = 1, Ntunes do nseq = 1, Ntunes write (ctext(8:8),"(I1)") neur
              write (ctext(20:20),"(I1)") nseq write (cseg(2:2),"(I1)") neur
              write (cseg(4:4),"(I1)") nseq call HF_OPEN_SEGMENT (cseg)

wl = -1.0 + (nseq - 1) * wwinc
                 wr = -1.0 + nseq * wwinc
                 wt =  1.0 - (neur - 1) * whinc
                 wb =  1.0 - neur * whinc call HF_SET_WINDOW (wl, wr, wb, wt)
                 call HF_SET_COLOR ('text = red, lines = black')
                 call HF_SET_CAMERA_BY_VOLUME ('Stretched',-1.0,1.0,-1.0,1.0)
                 call HF_SET_TEXT_SIZE (0.3)
                 call HF_INSERT_TEXT (0.0, -0.90, 0.0, ctext)

call HISTPLT (pnlaali, neur, nseq, ntri, Ntunes, actsf,
     1                                  Nlevs, Nphzs)

call HF_CLOSE_SEGMENT ()  ! Close cseg end do end do

END c  histplt.subr _____  jla  4/28/91
c
c  Plots the activity histogram for the indicated neuron, sequence, and trial
c  extracting the data from the pnlaali array.

Subroutine HISTPLT (pnlaali, neur, nseq, ntri, Ntunes, actsf,
     1                                  Nlevs, Nphzs)

real    pnlaali (Nlevs, Ntunes, Ntunes, Nphzs)

z  =  0.0                ! Z-coordinate of all lines.
        xl = -0.8                ! X-coordinate of left end of histograms.
        yb = -0.7                ! Y-coordinate of baseline of histograms.
        xsf = 1.6 / FLOAT (Nlevs) ! X scale factor do i = 1, Nlevs
           x = xl + xsf * FLOAT (i)
           y = yb + actsf * pnlaali (i, neur, nseq, ntri)
           call HF_INSERT_LINE (x, yb, z, x, y, z)
        end do

RETURN
        END c  deal.subr _____  jla  7/28/91
c
c  Deals ntot unique random numbers from the inclusive range of integers
c  from ibeg to iend.  Idum is required by the random number function.
```

```
c  Modified on 7/22/91 to permit ntot greater than the indicated range
c  by chopping ntot into as many subranges as necessary.  This is done
c  to assure a fairly uniform distribution.  This routine is inefficient
c  when the number of integers to be dealt is a large percentage of the
c  number of eligible integers.

Subroutine DEAL (nvect, ntot, ibeg, iend, idum)

common /RVARS/ ma(55), inext, inextp dimension        nvect(150)

if (iend.lt.ibeg) then
          print *,'***  Attempt to DEAL with ibeg greater than iend.  ***'
          print *,'** ntot, ibeg, iend:', ntot, ibeg, iend
          RETURN
       end if nspred = iend - (ibeg-1)
       rdiff = FLOAT (iend-ibeg)
       nrem = ntot
       nstp = 0

5      nstr = nstp + 1 if (nspred.lt.nrem) then
          lflg = .true.
          nstp = nstp + nspred
          nrem = nrem - nspred
       else
          lflg = .false.
          nstp = nstp + nrem
       endif nvect(nstr) = (ibeg) + NINT (RAN3(idum) * rdiff)

do i = nstr+1, nstp
10        tmp = (ibeg) + NINT (RAN3(idum) * rdiff)
          do j = nstr, i-1    ! Avoid repeated numbers.
             if (tmp.eq.nvect(j)) goto 10
          end do
          nvect(i) = tmp
       end do if (lflg) goto 5 c  Fix any out of range values (not expected to occur):

do i = 1, ntot
          if (nvect(i).lt.ibeg) nvect(i) = ibeg
          if (nvect(i).gt.iend) nvect(i) = iend
       end do

RETURN
       END c  ran3.func _____  jla  4/6/91
c
c  Returns a uniform random deviate between 0.0 and 1.0.  Set IDUM to any
c  negative value to initialize or reinitialize the sequence.  From "Numerical
c  Recipes," p. 199 (by Press, Flannery, Teukolsky, and Vetterling), based
c  on routine suggested by D. E. Knuth in Vol. 2 of "The Art of Computer
c  Programming," sections 3.2-3.3.

Function RAN3 (idum)

Parameter (mbig=1000000000,mseed=161803398,mz=0,fac=1./mbig)
c  According to Knuth, any large mbig, and any smaller (but still large)
c  mseed can be substituted for the above values.

common /RVARS/ ma(55), inext, inextp
```

```
      dimension ma(55)    ! This value is special and should not be modified.
      data iff /0/
      if(idum.lt.0.or.iff.eq.0)then    ! Initialization
        iff = 1
        mj = mseed-IABS(idum)          ! Initialize ma(55) using the seed
        mj = MOD (mj,mbig)             !   idum and the large number mseed.
        ma(55) = mj
        mk = 1
        do 11 i = 1, 54                ! Now initialize the rest of the
          ii = MOD (21*i,55)           !   table in a slightly random order,
          ma(ii) = mk                  !   with numbers that are not
          mk = mj - mk                 !   especially random.
          if (mk.lt.mz) mk = mk + mbig
          mj = ma(ii)
11      Continue
        do 13 k = 1, 4                 ! Randomize them by "warming up
          do 12 i = 1, 55              !   the generator."
            ma(i) = ma(i) - ma (1 + MOD (I+30,55))
            if (ma(i).lt.mz) ma(i) = ma(i) + mbig
12        Continue
13      Continue
        inext = 0      ! Prepare indices for our first generated number.
        inextp = 31    ! The constant 31 is special; see Knuth.
        idum = 1
      endif inext = inext + 1             ! Here is where we start, except on init.
      if (inext.eq.56) inext = 1    ! Inext wraps from 55 to 1.
      inextp = inextp + 1
      if (inextp.eq.56) inextp = 1  ! Ditto for inextp.
      mj = ma(inext) - ma(inextp)   ! Now generate a new random number
      if (mj.lt.mz) mj = mj + mbig  !   subtractively; be sure it is
      ma(inext) = mj                !   in range.  Store it,
      RAN3 = mj*fac                 !   and output the derived
                                    !   uniform deviate.
      RETURN
      END
```

I claim:

1. A method, based on a neural-network simulation, for recognizing input signals sequentially measured by sensory receptors from a pattern of interest at predetermined time steps, comprising the steps of:

storing a plurality of sensory input vectors, each representing the input signals measured at one of said predetermined time steps, in a sensory window memory matrix;

establishing a multiplicity of synaptic pairs for receiving signals from the sensory window memory matrix in a neural processor simulator by selecting pairs of individual synapses in said neural processor simulator and by assigning random connections between each synapse in said pairs of individual synapses and each individual element of said sensory window memory matrix;

assigning a chosen number of synaptic pairs to each of a multiplicity of neural levels in each of a multiplicity of neurons in said neural processor simulator;

selecting a neuron for learning a pattern of interest during a learning mode of operation of said neural processor simulator;

sequentially computing ratios, at predetermined recording intervals while signals from the pattern of interest are being measured by said sensory receptors during the learning mode of operation, of signals received from said sensory window memory matrix by all synaptic pairs in one neural level of said selected neuron, storing the ratios so calculated in a synaptic ratio matrix, and repeating this step for all levels in the neuron;

computing, at predetermined time intervals during a recognizing mode of operation of said neural processor simulator, an instantaneous activation of each synaptic pair in the neural processor simulator, said instantaneous activation being the difference between a corresponding value stored in said ratio matrix and a ratio calculated from signals currently received from said sensory window memory matrix;

computing, at each of said predetermined time intervals, a level activation for each level of each neuron in the neural processor simulator, said level activation being a sum of all synaptic-pair instantaneous activations in the level;

computing an integrated level activation for each level of each neuron in the neural processor simulator over a selected integration period, said integrated level activation being a sum of all level activation values over the selected integrated period;

computing a weighted level activation for each level by performing spatiotemporal summation of all integrated level activations at each selected integration period;

computing a preliminary neural activation for each neuron for the selected integration period by selecting a maximum value of all of the individual weighted level activations for the neuron;

computing an output neural activation from each neuron for the selected integration period by calculating an arithmetic average of all preliminary neural activation values over all neurons, by subtracting that average from each of individual preliminary neural activation values, and by setting negative differences equal to zero;

determining a neural processor simulator output by comparing all output neural activations so calculated to an output threshhold value and identifying a neuron, if any, with an output neural activation greater than said output threshhold value; and identifying a learned pattern associated with said neuron, if any, with an output neural activation greater than said output threshhold value.

2. The method described in claim 1, wherein said pattern of interest consists of an audio pattern.

3. The method described in claim 1, wherein said pattern of interest consists of a visual pattern.

4. The method described in claim 1, wherein said step of assigning random connections between each synapse in said pairs of individual synapses and each individual element of said sensory window memory matrix is constrained by limiting the connections of each pair of individual synapses to elements in a same modality of signals stored in the matrix.

5. The method described in claim 1, wherein said instantaneous activation of each synaptic pair in the neural processor simulator is calculated according to the equation $$P_{ab} = K_1 e^{-K_2[R_{ab}-(\ln A_0 - \ln B_0)]^2}$$

wherein subscripts a and b are used to refer to a synapse a and to a synapse b, respectively; where $P_{ab}$ represents the activation of a synaptic pair containing synapses a and b and recording the ratio a/b; $K_1$ and $K_2$ are empirical constant coefficients; $A_0$ and $B_0$ are values of signals received and recorded by synapses a and b, respectively, during learning; and $R_{ab}$ is a current ratio calculated according to the equation $$R_{ab} = \ln A - \ln B,$$

where A and B are current values of signals received by the synapses a and b, respectively.

6. The method described in claim 5, wherein $K_1 = 10,000$ and $K_2 = 0.1$.

7. The method described in claim 1, wherein said step of performing spatiotemporal summation of all integrated level activations at each selected integration period consists of summing half of the activation of a particular level for a current selected integration period with half of the activation of an immediately lower level at an immediately-prior selected integration period; provided that, for a first level, half of current and half of prior activations are both taken from the first level.

8. An apparatus, based on a neural-network model, for recognizing input signals sequentially measured by sensory receptors from a pattern of interest at predetermined time steps, comprising:

means for storing a plurality of sensory input vectors, each representing the input signals measured at one of said predetermined time steps, in a sensory window memory matrix;

means for establishing a multiplicity of synaptic pairs in said apparatus by selecting paris of individual synapses and by assigning random connections between each synapse in said pairs of individual synapses and each individual element of said sensory window memory matrix;

means for assigning a chosen number of synaptic pairs to each of a multiplicity of neural levels in each of a multiplicity of neurons in said apparatus;

means for selecting a neuron for learning a pattern of interest during a learning mode of operation of said apparatus;

means for sequentially computing ratios, at predetermined recording intervals while signals from the pattern of interest are being measured by said sensory receptors during the learning mode of operation, of signals received from said sensory window memory matrix by all synaptic pairs in one neural level of said selected neuron, means for storing the ratios so calculated in a synaptic ratio matrix, and means for repeating this step for all levels in the neuron;

means for computing, at predetermined time intervals during a recognizing mode of operation of said apparatus, an instantaneous activation of each synaptic pair in the apparatus, said instantaneous activation being the difference between a corresponding value stored in said ratio matrix and a ratio calculated from signals currently received from said sensory window memory matrix;

means for computing, at each of said predetermined time intervals, a level activation for each level of each neuron in the apparatus, said level activation being a sum of all synaptic-pair instantaneous activations in the level;

means for computing an integrated level activation for each level of each neuron in the apparatus over a selected integration period, said integrated level activation being a sum of all level activation values over the selected integrated period;

means for computing a weighted level activation for each level by performing spatiotemporal summation of all integrated level activations at each selected integration period;

means for computing a preliminary neural activation for each neuron for the selected integration period by selecting a maximum value of all of the individual weighted level activations for the neuron;

means for computing an output neural activation from each neuron for the selected integration period by calculating an arithmetic average of all preliminary neural activation values over all neurons, by subtracting that average from each of individual preliminary neural activation values, and by setting negative differences equal to zero;

means for determining a neural processor simulator output by comparing all output neural activations so calculated to an output threshhold value and by identifying a neuron, if any, with an output neural activation greater than said output threshhold value; and means for identifying a learned pattern associated with said neuron, if any, with an output neural activation greater than said output threshhold value.

9. The apparatus described in claim 8, wherein said pattern of interest consists of an audio pattern.

10. The apparatus described in claim 8, wherein said pattern of interest consists of a visual pattern.

11. The apparatus described in claim 8, wherein said means for assigning random connections between each synapse in said pairs of individual synapses and each individual element of said sensory window memory matrix is constrained by limiting the connections of each pair of individual synapses to elements in a same modality of signals stored in the matrix.

12. The apparatus described in claim 8, wherein said instantaneous activation of each synaptic pair in the apparatus is calculated according to the equation $$P_{ab} = K_1 e^{-K_2[R_{ab} - (\ln A_0 - \ln B_0)]^2}$$

wherein subscripts a and b are used to refer to a synapse a and to a synapse b, respectively; where $P_{ab}$ represents the activation of a synaptic pair containing synapses a and b and recording the ratio a/b; $K_1$ and $K_2$ are empirical constant coefficients; $A_0$ and $B_0$ are values of signals received and recorded by synapses a and b, respectively, during learning; and $R_{ab}$ is a current ratio calculated according to the equation $$R_{ab} = \ln A - \ln B,$$

where A and B are current values of signals received by the synapses a and b, respectively.

13. The apparatus described in claim 12, wherein $K_1 = 10,000$ and $K_2 = 0.1$.

14. The apparatus described in claim 8, wherein said spatiotemporal summation of all integrated level activations at each selected integration period is performed by providing means for summing half of the activation of a particular level for a current selected integration period with half of the activation of an immediately lower level at an immediately-prior selected integration period; provided that, for a first level, half of current and half of prior activations are both taken from the first level.

* * * * *